United States Patent
Wang et al.

(10) Patent No.: US 11,909,559 B2
(45) Date of Patent: Feb. 20, 2024

(54) QUASI CO-LOCATION INFORMATION DETERMINING METHOD, APPARATUS, AND DEVICE

(71) Applicant: HUAWEI TECHNOLOGIES CO., LTD., Guangdong (CN)

(72) Inventors: Ting Wang, Shanghai (CN); Haibao Ren, Shanghai (CN); Shengyue Dou, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 194 days.

(21) Appl. No.: 16/990,182

(22) Filed: Aug. 11, 2020

(65) Prior Publication Data
US 2020/0374060 A1    Nov. 26, 2020

Related U.S. Application Data

(63) Continuation of application No. PCT/CN2019/074631, filed on Feb. 2, 2019.

(30) Foreign Application Priority Data

Feb. 11, 2018   (CN) .......................... 201810141764.0

(51) Int. Cl.
*H04L 25/02*   (2006.01)
*H04L 5/00*   (2006.01)
(Continued)

(52) U.S. Cl.
CPC ......... *H04L 25/0204* (2013.01); *H04B 7/024* (2013.01); *H04B 7/066* (2013.01);
(Continued)

(58) Field of Classification Search
CPC ............. H04L 25/0204; H04L 25/0242; H04L 25/0228; H04L 5/0023; H04L 5/0035;
(Continued)

(56) References Cited

U.S. PATENT DOCUMENTS 10,651,910 B2    5/2020   Chen et al.
2015/0349855 A1*  12/2015  Sesia ...................... H04B 7/024
                                                        370/252
(Continued)

FOREIGN PATENT DOCUMENTS

CN    105471559 A    4/2016
CN    107251450 A   10/2017
(Continued)

OTHER PUBLICATIONS

Nokia et al., "Summary of QCL", 3GPP TSG RAN WG1 Meeting AH 1801,R1-1801054, Vancouver, Canada, Jan. 22-26, 2018, 25 pages.
(Continued)

*Primary Examiner* — Redentor Pasia
(74) *Attorney, Agent, or Firm* — Fish & Richardson P.C.

(57) ABSTRACT

Example quasi co-location information determining methods and apparatus are described. One example method includes determining a quantity X of pieces of quasi co-location QCL information, where X is a positive integer. When it is determined that the quantity X of pieces of QCL information is two, and that DCI corresponding to a current data channel does not indicate QCL information of an antenna port of the data channel, or that an interval between the current data channel and the DCI corresponding to the data channel is less than a threshold, two pieces of default QCL information of the antenna port of the data channel are determined.

15 Claims, 4 Drawing Sheets

---

Determine a quantity X of pieces of QCL information  — S301

Determine X pieces of QCL information of the antenna port of the data channel when it is determined that the quantity X of pieces of QCL information is at least two  — S302

(51) Int. Cl.
| | |
|---|---|
| *H04W 8/24* | (2009.01) |
| *H04W 56/00* | (2009.01) |
| *H04B 7/024* | (2017.01) |
| *H04B 7/06* | (2006.01) |
| *H04B 17/309* | (2015.01) |
| *H04B 7/08* | (2006.01) |
| *H04W 72/044* | (2023.01) |
| *H04W 28/18* | (2009.01) |
| *H04L 69/28* | (2022.01) |
| *H04W 72/23* | (2023.01) |
| *H04W 72/53* | (2023.01) |

(52) U.S. Cl.
CPC ......... *H04B 7/0619* (2013.01); *H04B 7/0626* (2013.01); *H04B 7/0634* (2013.01); *H04B 7/086* (2013.01); *H04B 17/309* (2015.01); *H04L 5/0023* (2013.01); *H04L 5/0035* (2013.01); *H04L 5/0048* (2013.01); *H04L 5/0053* (2013.01); *H04L 25/0242* (2013.01); *H04L 69/28* (2013.01); *H04W 8/24* (2013.01); *H04W 28/18* (2013.01); *H04W 56/001* (2013.01); *H04W 72/044* (2013.01); *H04W 72/23* (2023.01); *H04W 72/53* (2023.01)

(58) Field of Classification Search
CPC ..... H04L 5/0048; H04L 5/0053; H04B 7/024; H04B 7/0619; H04B 7/0626; H04B 7/0634; H04B 7/066; H04B 7/086; H04B 7/0621; H04B 7/0628; H04B 7/063; H04B 7/0632; H04B 7/0636; H04B 7/0639; H04B 7/0645; H04B 7/0647; H04B 7/065; H04B 7/0658; H04B 7/0663; H04B 7/0862; H04B 17/309; H04B 17/318; H04B 17/364; H04W 56/001; H04W 72/042; H04W 72/0493
See application file for complete search history.

(56) References Cited

U.S. PATENT DOCUMENTS

| | | | |
|---|---|---|---|
| 2017/0105112 A1 | 4/2017 | Park et al. | |
| 2018/0042028 A1* | 2/2018 | Nam | H04L 5/0035 |
| 2018/0287681 A1* | 10/2018 | Chen | H04L 5/005 |
| 2018/0343653 A1* | 11/2018 | Guo | H04W 72/542 |
| 2018/0352533 A1* | 12/2018 | Islam | H04W 72/0413 |
| 2019/0141693 A1* | 5/2019 | Guo | H04W 16/14 |
| 2019/0158163 A1* | 5/2019 | Subramanian | H04B 7/088 |
| 2019/0190582 A1* | 6/2019 | Guo | H04L 1/0061 |
| 2019/0222284 A1* | 7/2019 | Huang | H04W 72/23 |
| 2019/0222289 A1* | 7/2019 | John Wilson | H04W 72/046 |
| 2019/0229792 A1* | 7/2019 | John Wilson | H04L 5/0048 |
| 2019/0230545 A1* | 7/2019 | Liou | H04W 24/10 |
| 2019/0246395 A1* | 8/2019 | Huang | H04W 72/12 |
| 2020/0007292 A1* | 1/2020 | Huang | H04B 7/0695 |
| 2020/0083966 A1* | 3/2020 | Dou | H04B 17/12 |
| 2020/0178280 A1* | 6/2020 | Guan | H04B 7/088 |
| 2020/0359448 A1* | 11/2020 | Takeda | H04L 5/10 |
| 2021/0153209 A1* | 5/2021 | Guan | H04W 72/0493 |
| 2022/0007258 A1* | 1/2022 | Liou | H04W 72/23 |
| 2023/0208490 A1* | 6/2023 | Kim | H04L 5/0051 370/329 |

FOREIGN PATENT DOCUMENTS

| | | |
|---|---|---|
| CN | 104081683 B | 3/2018 |
| EP | 2946480 B1 | 9/2018 |
| WO | 2017050033 A1 | 3/2017 |
| WO | 2017171481 A1 | 10/2017 |

OTHER PUBLICATIONS

Qualcomm, "Offline Discussion on Beam Management",3GPP TSG RAN WG1 Meeting #90,R1-1714885, Prague, Czech, Aug. 21-25, 2017, 2 pages.
3GPP TS 36.211 V13.2.0 (Jun. 2016), 3rd Generation Partnership Project, Technical Specification Group Radio Access Network,Evolved Universal Terrestrial Radio Access (E-UTRA),Physical channels and modulation(Release 13), 170 pages.
3GPP TS 38.214 V15.0.0 (Dec. 2017), 3rd Generation Partnership Project, Technical Specification Group Radio Access Network,NR,Physical layer procedures for data (Release 15), 71 pages.
Samsung, "On Beam Indication",3GPP TSG RAN WG1 Meeting 90bis,R1-1717627, Prague, CZ, Oct. 9-13, 2017, 9 pages.
3GPP TS 38.321 V15.0.0 (Dec. 2017),3rd Generation Partnership Project, Technical Specification Group Radio Access Network,NR,Medium Access Control (MAC) protocol specification(Release 15), 55 pages.
Office Action issued in Chinese Application No. 201810141764.0 dated Mar. 4, 2020, 23 pages (With English Translation).
PCT International Search Report and Written Opinion in International Application No. PCT/CN2019/074,631, dated Apr. 18, 2019, 17 pages (With English Translation).
Extended European Search Report issued in European Application No. 19750486.3 dated Feb. 9, 2021, 13 pages.
Intel Corporation, "On QCL for NR," 3GPP TSG HAN WG1 Meeting NR#3, R1-1716304, Nagoya, Japan, Sep. 18-21, 2017, 8 pages.
Nokia et al., "On QCL Framework and Configurations in NR," 3GPP TSG HAN WG1#90, R1-1714261, Prague, Czech Republic, Aug. 21-25, 2017, 8 pages.

\* cited by examiner

QUASI CO-LOCATION INFORMATION DETERMINING METHOD, APPARATUS, AND DEVICE

CROSS-REFERENCE TO RELATED APPLICATIONS

This application is a continuation of International Application No. PCT/CN2019/074631, filed on Feb. 2, 2019, which claims priority to Chinese Patent Application No. 201810141764.0, filed on Feb. 11, 2018. The disclosures of the aforementioned applications are hereby incorporated by reference in their entireties.

TECHNICAL FIELD

This application relates to the field of communications technologies, and in particular, to a quasi co-location information determining method, apparatus, and device.

BACKGROUND

When two antenna ports have same quasi co-location (QCL) information, that is, when the two antenna ports are QCL, a channel feature of an antenna port may be estimated based on a channel feature of another antenna port.

In an actual application process, to estimate a channel feature of an antenna port, QCL information of the antenna port needs to be first obtained, an antenna port whose QCL information is the same as that of the antenna port and through which a signal has been received is searched for based on the QCL information of the antenna port, and the channel feature of the antenna port is estimated based on a channel feature of the found antenna port.

Currently, a solution for determining at least two pieces of QCL information of an antenna port of a data channel is urgently needed.

SUMMARY

This application provides a quasi co-location information determining method, apparatus, and device, to determine at least two pieces of QCL information.

According to a first aspect, this application provides a quasi co-location information determining method. The method includes: first determining a quantity X of pieces of QCL information (X is a positive integer), and when it is determined that the quantity X of pieces of QCL information is greater than or equal to 2, determining X pieces of QCL information of an antenna port of a data channel.

The method in the first aspect may be performed by a terminal device, or may be performed by a network device. For example, the network device may be a base station or a transmission point.

The QCL information may be information used to determine a channel large-scale characteristic parameter. That two antenna ports have a quasi co-location (quasi co-located, QCL) relationship means that a channel large-scale characteristic parameter of one antenna port may be inferred based on a conveyed channel large-scale characteristic parameter of another antenna port. The large-scale characteristic parameter may include one or more of an average gain, an average delay, delay spread, a Doppler frequency shift (Doppler shift), Doppler spread, or a spatial parameter (spatial Rx parameters).

The spatial parameter may include one or more of an angle of arrival (AOA), a dominant angle of arrival (dominant AoA), an average angle of arrival (average AoA), an angle of departure (AOD), a channel correlation matrix, a power angle spread spectrum of the angle of arrival, an average angle of departure (average AoD), a power angle spread spectrum of the angle of departure, a transmit channel correlation, a receive channel correlation, transmit beamforming, receive beamforming, a spatial channel correlation, a spatial filter, a spatial filtering parameter, a spatial reception parameter, weight information, or the like.

The QCL information may be further used to indicate a parameter type of a channel.

Optionally, the foregoing process may be applied to a scenario in which at least two network devices or at least two non-QCL antenna panels of a same network device simultaneously send data to a terminal device, so that X pieces of QCL information of an antenna port of a data channel may be determined.

Optionally, when an interval between a time of receiving performed on the data channel and a time of receiving performed on a control channel on which DCI corresponding to the data channel is located is less than a threshold, or DCI corresponding to the data channel does not include indication information used to indicate the QCL information of the antenna port of the data channel, the quantity X of pieces of QCL information may be determined.

The DCI corresponding to the data channel is used to indicate scheduling information of the data channel.

Optionally, the quantity X of pieces of QCL information may be determined in the following feasible implementation:

determining the quantity X of pieces of QCL information based on at least one of the following parameters: QCL configuration information of a terminal device, an obtained synchronization signal block SSB feature, an obtained subcarrier spacing, a transmission mode of the terminal device, an obtained DCI feature, an obtained QCL capability, an obtained maximum quantity of pieces of downlink control information DCI that needs to be detected, a capability of the terminal device, or an obtained data transmission scenario. A specific parameter or some specific parameters that are in the foregoing parameters and that are used to determine the quantity X of pieces of QCL information may be defined in a protocol and is preset in the terminal device or the network device, or may be notified by the network device to the terminal device, or may be determined by the network device and the terminal device according to a rule. This is not limited herein.

On a network device side, the network device determines a relationship between at least one of the foregoing parameters and the determined quantity of pieces of QCL information, and determines, based on a required quantity of pieces of QCL information, at least one of the foregoing parameters corresponding to the quantity of pieces of QCL information. Optionally, the network device may send, to the terminal device, all or some parameters that are in the foregoing parameters and that correspond to the determined quantity of pieces of QCL information. Optionally, during data transmission, the network device may determine the quantity of pieces of QCL information of the antenna port of the data channel based on all or some parameters that are in the foregoing parameters and that are sent to the terminal device. Optionally, the network device may determine the quantity of pieces of QCL information based on a notification from the terminal device.

On a terminal device side, the terminal device determines the quantity of pieces of QCL information of the antenna port of the data channel based on the learned at least one of the foregoing parameters and a relationship between the at least one of the foregoing parameters and the quantity of pieces of QCL information. The terminal device may learn of the at least one of the foregoing parameters based on a notification from the network device. Optionally, the terminal device may send the determined quantity of pieces of QCL information to the network device.

Optionally, the relationship between the at least one of the foregoing parameters and the quantity of pieces of QCL information may be all or partially preset in the network device and the terminal device, for example, preset through definition in a protocol, or may be sent by the network device to the terminal, for example, in an explicit indication manner, or may be separately learned of by the network device and the terminal device according to a preset rule (or with reference to other information), for example, in an implicit indication manner.

In this application, optionally, the QCL configuration information includes indication information used to indicate QCL information of an antenna port of a reference signal, the indication information includes a QCL type, and the QCL type is used to indicate a QCL parameter.

Optionally, the indication information may be indication information used to indicate the QCL information of the antenna port of the reference signal, or may be indication information used to indicate the QCL information of the antenna port of the data channel and/or QCL information of an antenna port of a control channel.

The QCL type includes at least one of a quasi co-location type A (QCL-TypeA), a quasi co-location type B (QCL-TypeB), a quasi co-location type C (QCL-TypeC), or a quasi co-location type D (QCL-TypeD). The QCL parameter indicated by the QCL type may include the channel large-scale characteristic parameter.

In this application, the SSB feature includes a quantity of SSBs transmitted by the network device in one or more time units.

The time unit may be predefined in a protocol. The time unit may be a timeslot, a subframe, a radio frame, a half frame, 5 ms, 10 ms, another time unit, or the like.

In this application, the subcarrier spacing includes at least one of a subcarrier spacing of remaining minimum system information RMSI, a subcarrier spacing of an SSB, or a subcarrier spacing of a bandwidth part BWP.

Optionally, the RMSI may be system information other than system information carried on a PBCH.

Optionally, the RMSI may be minimum system information that is of a system and that is used for initial access, or may be broadcast system information and/or dedicated system information.

Optionally, the minimum system information that is of a system and that is used for initial access may include master information and remaining minimum system information, for example, a master information block (MIB) and the remaining minimum system information.

Optionally, the SSB may be synchronization information, for example, may include primary synchronization information and secondary synchronization information, or may include broadcast information. The SSB is a signal or a channel used for synchronization.

Optionally, the bandwidth part (BWP) may be a part of system bandwidth. The bandwidth part may include at least one contiguous or noncontiguous subcarrier. The bandwidth part may also be referred to as a bandwidth resource, a carrier bandwidth part, a frequency resource part, a partial frequency resource, a carrier bandwidth part, a subband a narrowband, or another name. For different bandwidth resources, a bandwidth resource 0 and a bandwidth resource 1 are used as an example. Frequency domain resources of the bandwidth resource 0 and the bandwidth resource 1 may partially or completely overlap, or do not overlap at all. For example, in an orthogonal frequency division multiplexing technology (OFDM)-based communications system, the frequency domain resources of the bandwidth resource 0 and the bandwidth resource 1 completely overlap, but have different frame structures (for example, subcarrier spacings and/or CP lengths). This is not limited in this embodiment of this application.

In this application, the transmission mode includes at least one of single-cell transmission, coordinated transmission, dynamic point selection DPS (or dynamic cell selection DCS) transmission, or non-coherent joint transmission NCJT.

Optionally, the coordinated transmission may be that at least two network devices coordinately transmit data to the terminal device (which is briefly referred to as a terminal). For example, the at least two network devices may simultaneously transmit the data to the terminal device, and the data may be same data or different data. Alternatively, the at least two network devices may make an overall decision on a beam, precoding, and/or power, and determine a beam, precoding, or power for respective signal transmission. For example, the coordinated transmission may be a related technology or a transmission method in coordinated multi-point (CoMP) transmission or enhanced coordinated multi-point (Further enhancements to Coordinated Multi-Point, FeCoMP) transmission. Specifically, this is not limited in this application.

In this application, the DCI feature includes at least one of a DCI format, a quantity of bits included in DCI, a payload size of the DCI, a byte of the DCI, a payload of the DCI, or a feature of a specific field of the DCI.

The DCI formats may include a first format and a second format. The first format is a DCI format used in a first transmission mode, and the first transmission mode includes single-cell transmission. The second format is a DCI format used in a second transmission mode, and the second transmission mode includes one of coordinated transmission, dynamic point selection DPS (or dynamic cell selection DCS) transmission, or non-coherent joint transmission NCJT.

The quantity of bits included in the DCI may be a quantity of bits carried in the DCI, a value of a bit carried in the DCI, or the payload size of the DCI.

The feature of the specific field of the DCI may be whether the specific field or a value of the specific field exists in the DCI.

In this application, the QLC capability includes at least one of a quantity of pieces of indication information that is supported by the terminal device and that is used to indicate the QCL information of the antenna port of the reference signal, or a quantity of reference signal sets RS sets associated with the indication information that is supported by the terminal device and that is used to indicate the QCL information of the antenna port of the reference signal.

In this application, the capability of the terminal device includes a quantity of panels supported by the terminal device, and/or a maximum quantity of pieces of DCI that can be detected by the terminal device.

In this application, the obtained maximum quantity of pieces of DCI that needs to be detected is a maximum quantity of pieces of DCI that is configured by the network device (for example, a base station) and that needs to be detected by the terminal device, a predefined maximum quantity of pieces of DCI that needs to be detected by the terminal device, or a maximum quantity of pieces of DCI that the terminal device needs to attempt to detect.

In this application, a data transmission scenario includes a scenario in which it is determined that the quantity of pieces of QCL information is one, or a scenario in which the quantity of pieces of QCL information cannot be determined.

Optionally, the quantity X of pieces of QCL information may be determined in one or a combination of at least two of the following manners. It may be understood that a specific manner or a combination of some specific manners used to determine the quantity of pieces of QCL information may be defined in a protocol and preset in the network device and the terminal device, may be notified by the network device to the terminal device, or may be determined by the network device and the terminal device according to a rule. This is not limited herein.

Manner 1: Determine the quantity of pieces of QCL, information based on whether the QCL, configuration information of the terminal device includes a spatial QCL parameter and/or a QCL type D.

Optionally, the spatial QCL parameter may be a spatial reception parameter (spatial RX parameter), or may be another spatial parameter, for example, a spatial parameter or another spatial parameter mentioned in this application. This is not limited in this application.

Optionally, the QCL type is used to indicate information about a QCL parameter. For example, the QCL type D may be a spatial QCL parameter. Alternatively, another QCL type may be used to indicate the spatial QCL parameter, or the like. This is not limited in this application.

Manner 2: Determine the quantity of pieces of QCL information based on an obtained quantity of SSBs transmitted by the network device in N time units, where N is a positive integer.

Manner 3: Determine the quantity of pieces of QCL information based on the obtained subcarrier spacing.

Manner 4: Determine the quantity of pieces of QCL information based on the transmission mode of the terminal device.

Manner 5: Determine the quantity of pieces of QCL information based on the obtained DCI format.

Manner 6: Determine the quantity of pieces of QCL information based on the obtained quantity of bits of the DCI, the payload size of the DCI, the byte of the DCI, or the payload of the DCI.

Manner 7: Determine the quantity of pieces of QCL information based on the obtained feature of the specific field of the DCI.

Manner 8: Determine the quantity of pieces of QCL, information based on the quantity of pieces of indication information that is supported by the terminal device and that is used to indicate the QCL information of the antenna port of the reference signal, and/or the quantity of RS sets associated with the indication information that is supported by the terminal device and that is used to indicate the QCL information of the antenna port of the reference signal.

Manner 9: Determine the quantity of pieces of QCL information based on the maximum quantity of pieces of DCI that needs to be detected.

Manner 10: Determine the quantity of pieces of QCL, information based on the maximum quantity of pieces of DCI that can be detected by the terminal device.

Manner 11: Determine the quantity of pieces of QCL information based on the quantity of panels supported by the terminal device.

Manner 12: Determine the quantity of pieces of QCL information based on the obtained data transmission scenario.

Optionally, when it is determined that the parameter meets at least one of the following conditions, it is determined that the quantity X of pieces of QCL information is two. A specific condition or some specific conditions that need to be met by the parameter may be defined in a protocol and is preset in the terminal device or the network device, or may be notified by the network device to the terminal device, or may be determined by the network device and the terminal device according to a rule. This is not limited herein.

The QCL configuration information of the terminal device includes the spatial QCL parameter, or includes the QCL type D.

The obtained quantity of SSBs transmitted by the network device in the N time units is greater than or equal to a first threshold, and N is a positive integer.

The obtained subcarrier spacing is greater than or equal to a second threshold.

The transmission mode of the terminal device is the second transmission mode, and the second transmission mode includes one of coordinated transmission, dynamic point selection DPS transmission, or non-coherent joint transmission NCJT.

The obtained DCI format is the second format, and the second format is the DCI format used in the second transmission mode.

The obtained quantity of bits of the DCI is greater than or equal to a third threshold.

The obtained DCI includes the specific field, or the value of the specific field of the obtained DCI belongs to a specific range (including a unique specific value).

The quantity of pieces of indication information that is supported by the terminal device and that is used to indicate the QCL information of the antenna port of the reference signal is at east two.

The quantity of RS sets associated with the indication information that is supported by the terminal device and that is used to indicate the QCL information of the antenna port of the reference signal is at least two.

The maximum quantity of pieces of DCI that needs to be detected is greater than 1.

The maximum quantity of pieces of DCI that can be detected by the terminal device is greater than 1.

The quantity of panels supported by the terminal device is greater than 1.

The data transmission scenario is that the quantity of pieces of QLC information cannot be determined, or it is determined that the quantity of pieces of QCL information is greater than 1.

Optionally, when it is determined that the parameter meets at least one of the following conditions, it is determined that the quantity X of pieces of QCL information is one. A specific condition or some specific conditions that need to be met by the parameter may be defined in a protocol and is preset in the terminal device or the network device, or may be notified by the network device to the terminal device, or may be determined by the network device and the terminal device according to a rule. This is not limited herein.

The QCL configuration information of the terminal device does not include the spatial QCL parameter or does not include the QCL type D.

The obtained quantity of SSBs transmitted by the network device in the N time units is less than or equal to a first threshold, and N is a positive integer. Optionally, a value of N may be defined by a protocol, and is preset in the terminal device or the network device, or may be notified by the network device to the terminal device, or may be determined by the network device and the terminal device according to a rule. This is not limited herein.

The obtained subcarrier spacing is less than or equal to a second threshold.

The transmission mode of the terminal device is the first transmission mode, and the first transmission mode includes single-cell transmission.

The obtained DCI format is the first format, and the first format is a DCI format used in the first transmission mode.

The obtained quantity of bits of the DCI is less than or equal to a third threshold.

An obtained DCI does not include the specific field, or a value of the specific field of the obtained DCI belongs to a specific range (including a unique specific value).

The quantity of pieces of indication information that is supported by the terminal device and that is used to indicate the QCL information of the antenna port of the reference signal is one, and the quantity of RS sets associated with the indication information that is supported by the terminal device and that is used to indicate the QCL information of the antenna port of the reference signal is one.

The maximum quantity of pieces of DCI that needs to be detected is one.

The maximum quantity of pieces of DCI that can be detected by the terminal device is one.

The quantity of panels supported by the terminal device is one.

The data transmission scenario is that it is determined that the quantity of pieces of QCL information is one.

Optionally, the X pieces of QCL information of the antenna port of the data channel may be determined in the following feasible implementations. A specific manner or a combination of some specific manners used to determine the X pieces of QCL information of the antenna port of the data channel may be defined in a protocol and preset in the network device and the terminal device, may be notified by the network device to the terminal device, or may be determined by the network device and the terminal device according to a rule. This is not limited herein.

The X pieces of QCL information of the antenna port of the data channel based on at least one of the first indication information set, the second indication information set, or the third indication information set.

The first indication information set includes first indication information that is in a CORESET and that is used to indicate QCL information of an antenna port of a downlink control channel, the second indication information set includes second indication information (which is all or some of the indication information in the QCL configuration information) that is configured by using higher layer signaling and that is used to indicate QCL information of an antenna port of a reference signal, and the third indication information set includes third indication information that is in DCI existing at a latest moment and that is used to indicate QCL, information of an antenna port of a data channel scheduled by using the DCI. It may be understood that optionally, when the network device determines the X pieces of QCL information of the antenna port of the data channel based on at least one of the first indication information set, the second indication information set, or the third indication information set, the third indication information set includes third indication information that is in DCI sent at the latest moment and that is used to indicate the QCL information of the antenna port of the data channel scheduled by using the DCI. Optionally, when the terminal device determines the X pieces of QCL information of the antenna port of the data channel based on at least one of the first indication information set, the second indication information set, or the third indication information set, the third indication information set includes third indication information that is in DCI received at the latest moment and that is used to indicate the QCL information of the antenna port of the data channel scheduled by using the DCI. That is, optionally, for the network device, the DCI existing at the latest moment is the DCI sent at the latest moment. Optionally, for the terminal device, the DCI existing at the latest moment is the DCI received at the latest moment.

The antenna port of the downlink control channel may be an antenna port of a DMRS of the downlink control channel and/or an antenna port of a PTRS of the downlink control channel. The antenna port of the data channel scheduled by using the DCI may be an antenna port of a DMRS of the data channel and/or an antenna port of a PTRS of the data channel.

The DCI existing at the latest moment may be DCI existing at the latest one or more moments, for example, may be DCI existing in the latest one or more time units. The time unit may be a timeslot, a subframe, a radio frame, a half frame, 5 ms, 10 ms, another time unit, or the like. Optionally, the latest one or more moments may belong to one time window, and a size of the time window may be defined in a protocol and is preset in the terminal device or the network device, or may be notified by the network device to the terminal device, or may be determined by the network device and the terminal device according to a rule. This is not limited herein.

Optionally, the X pieces of QCL information may be determined in one or a combination of at least two of the following manners. A specific manner or a combination of some specific manners may be defined in a protocol and preset in the terminal device and the network device, may be notified by the network device to the terminal device, or may be determined by the network device and the terminal device according to a rule. This is not limited herein.

Manner 1: Determine A pieces of QCL information in the X pieces of QCL information of the antenna port of the data channel based on the first indication information set, where A is a positive integer, and A is less than or equal to X.

The first indication information in the first indication information set meets a first rule, and the first rule is:

first indication information in A CORESETs with smallest identifiers, where each of the A CORESETs includes one piece of first indication information, and each piece of first indication information is associated with one RS set;

first indication information in A CORESETs with smallest identifiers, where each of the A CORESETs includes one piece of first indication information, different CORESETs in the A CORESETs include different first indication information, and each piece of first indication information is associated with one RS set;

A pieces of first indication information in P CORESETs with smallest identifiers, where at least one of the P CORESETs includes at least two pieces of first indication information, P is a positive integer and is less than A, and each piece of first indication information is associated with one RS set; or Y pieces of first indication information in Q CORESETs with smallest identifiers, where at least one piece of first indication information included in the Q CORESETs is associated with at least two RS sets, Q is a positive integer and is less than A, and Y is a positive integer and is less than A.

In specific implementation, the first rule that is specifically met may be defined in a protocol and is preset in the terminal device or the network device, or may be notified by the network device to the terminal device, or may be determined by the network device and the terminal device according to a rule. This is not limited herein.

In this application, the smallest identifier is used in an example of each rule. It may be understood that a largest identifier may alternatively be used. This is not limited herein. A solution corresponding to the "largest identifier" can be obtained by replacing the smallest identifier with the largest identifier.

The A CORESETs with the smallest identifier, the P CORESETs with the smallest identifier, or the Q CORESETs with the smallest identifier may be determined from CORESETs received by the terminal device in the latest one or more time units (or CORESETs sent by the network device in the latest one or more time units). The time unit may be a timeslot, a subframe, a radio frame, a half frame, 5 ms, 10 ms, another time unit, or the like, Optionally, the latest one or more time units belong to one time window, and a size of the time window may be defined in a protocol and is preset in the terminal device or the network device, or may be notified by the network device to the terminal device, or may be determined by the network device and the terminal device according to a rule. This is not limited herein.

The A CORESETs with the smallest identifier may alternatively be determined from all CORESETs received by the terminal device (or all CORESETs sent by the network device).

Optionally, A meets Formula 1:

$$A=\Sigma_{m=1}^{m=M}(\Sigma_{k=1}^{k=n_m} Y_{m,k})$$ Formula 1

Herein, M is a total quantity of CORESETs with the smallest identifier, m is the $m^{th}$ CORESET in the CORESETs with the smallest identifier, and k is the $k^{th}$ indication information in the $m^{th}$ CORESET in the CORESETs with the smallest identifier, $Y_{m,k}$ is a quantity of RS sets associated with the $k^{th}$ indication information in the mm CORESET in the CORESETs with the smallest identifier, and $n_m$ is a quantity of pieces of indication information in the $m^{th}$ CORESET in the CORESETs with the smallest identifier. The first indication information set includes indication information in the foregoing formula, and a quantity of pieces of indication information in the foregoing formula is $\Sigma_{m=1}^{m=M} n_m$.

Optionally, at least two pieces of indication information in the foregoing formula are the same.

Optionally, the indication information in the foregoing formula is different.

Optionally, at least two RS sets in the foregoing formula are the same.

Optionally, the RS sets in the foregoing formula are different. That the RS sets are different may include that at least one RS identifier ID in the RS set is different, and/or at least one QCL type is different.

Optionally, the M CORESETs with the smallest identifier are M CORESETs with the smallest identifier that are configured for the terminal device in the latest one or more time units, for example, slots. Optionally, the latest one or more time units belong to one time window, and a size of the time window may be defined in a protocol and is preset in the terminal device or the network device, or may be notified by the network device to the terminal device, or may be determined by the network device and the terminal device according to a rule. This is not limited herein.

Optionally, the M CORESETs with the smallest identifier are M CORESETs with the smallest identifier in CORESETs configured for the terminal device.

Manner 2: Determine B pieces of QCL information in the X pieces of QCL information of the antenna port of the data channel based on the second indication information set, where B is a positive integer, and B is less than or equal to X.

The second indication information in the second indication information set meets a second rule, and the second rule is:

B pieces of second indication information with smallest identifiers, where each piece of second indication information is associated with one RS set: or K pieces of second indication information with smallest identifiers, where at least one piece of second indication information in the K pieces of second indication information is associated with at least two RS sets, and K is a positive integer and is less than B.

In specific implementation, the second rule that is specifically met may be defined in a protocol and is preset in the terminal device or the network device, or may be notified by the network device to the terminal device, or may be determined by the network device and the terminal device according to a rule. This is not limited herein.

Optionally, B meets Formula 2:

$$B=\Sigma_{d=1}^{d=D} Z_d$$ Formula 2

Herein, D is a total quantity of pieces of second indication information with smallest identifiers, d is the $d^{th}$ second indication information in the second indication information with the smallest identifiers, and $Z_d$ is a quantity of RS sets associated with the $d^{th}$ second indication information in the second indication information with the smallest identifiers. The second indication information set includes indication information in the foregoing formula, and a quantity of pieces of indication information in the foregoing formula is D.

Optionally, at least two pieces of indication information in the foregoing formula are the same.

Optionally, the indication information in the foregoing formula is different.

Optionally, at least two RS sets in the foregoing formula are the same.

Optionally, the RS sets in the foregoing formula are different. That the RS sets are different may include that at least one RS identifier ID in the RS set is different, and/or at least one QCL type is different.

Optionally, the second indication information is a transmission configuration indicator (TCI) state.

Manner 3: Determine C pieces of QCL information in the X pieces of QCL information of the antenna port of the data channel based on the third indication information set, where C is a positive integer, and C is less than or equal to X.

The third indication information in the third indication information set meets a third rule, and the third rule is:

third indication information in C pieces of DCI received (or sent) at the latest moment, where each of the C pieces of DCI includes one piece of third indication information, and each piece of third indication information is associated with one RS set;

third indication information in C pieces of DCI received (sent) at the latest moment, where each of the C pieces of DCI includes one piece of third indication information, different DCI in the C pieces of DCI includes different third indication information, and each piece of third indication information is associated with one RS set;

C pieces of third indication information in K pieces of DCI received (or sent) at the latest moment, where at least one of the K pieces of DCI includes at least two pieces of third indication information, K is a positive integer and is less than C, and each piece of third indication information is associated with one RS set; or Z pieces of third indication information in T pieces of DCI received (or sent) at the latest moment, where at least one piece of third indication information in the third indication information in the T pieces of DCI is associated with at least two RS sets, T is a positive integer and is less than C, and Z is a positive integer and is less than C. At least one of the T pieces of DCI may include at least one piece of third indication information.

In specific implementation, the third rule that is specifically met may be defined in a protocol and is preset in the terminal device or the network device, or may be notified by the network device to the terminal device, or may be determined by the network device and the terminal device according to a rule. This is not limited herein.

Optionally, C meets Formula 3:

$$C = \Sigma_{h=1}^{h=H}(\Sigma_{t=1}^{t=n_h} Y_{h,t})$$  Formula 3

Herein, H is a total quantity of pieces of DCI received (or sent) at a latest moment, h is the $h^{th}$ DCI in the DCI received (or sent) at the latest moment, t is the $t^{th}$ indication information in the $h^{th}$ DCI in the DCI received (or sent) at the latest moment, $Y_{h,t}$ is a quantity of RS sets associated with the $t^{th}$ indication information in the $h^{th}$ DCI in the DCI received (or sent) at the latest moment, and $n_h$ is a quantity of pieces of indication information in the $h^{th}$ DCI in the DCI received (or sent) at the latest moment. The third indication information set includes indication information in the foregoing formula, and a quantity of pieces of indication information in the foregoing formula is $\Sigma_{h=i}^{h=H} n_h$.

Optionally, at least two pieces of indication information in the foregoing formula are the same.

Optionally, the indication information in the foregoing formula is different.

Optionally, at least two RS sets in the foregoing formula are the same.

Optionally, the RS sets in the foregoing formula are different. That the RS sets are different may include that at least one RS identifier ID in the RS set is different, and/or at least one QCL type is different.

The DCI received (or sent) at the latest moment may be DCI received (or sent) at the latest one or more moments, for example, may be DCI received (or sent) in the latest one or more time units. The time unit may be a timeslot, a subframe, a radio frame, a half frame, 5 ms, 10 ms, another time unit, or the like. Optionally, the latest one or more moments may belong to one time window, and a size of the time window may be defined in a protocol and is preset in the terminal device or the network device, or may be notified by the network device to the terminal device, or may be determined by the network device and the terminal device according to a rule. This is not limited herein.

According to a second aspect, this application provides a communications apparatus, including some modules, configured to perform the method according to any one of the first aspect or the possible implementations of the first aspect. Specific modules may correspond to the method steps, and details are not described herein again.

According to a third aspect, this application provides a communications apparatus, including a processor, where the processor is coupled to a memory;

the memory is configured to store a computer program; and the processor is configured to execute the computer program stored in the memory, to enable the apparatus to perform the method according to any one of the first aspect or the possible implementations of the first aspect.

According to a fourth aspect, this application provides a readable storage medium, including a program or an instruction. When the program or the instruction is run on a computer, the method according to any one of the first aspect or the possible implementations of the first aspect is performed.

According to a fifth aspect, a computer program product is provided. The computer program product includes computer program code. When the computer program code is run on a computer, the computer is enabled to perform the method according to any one of the first aspect or the possible implementations of the first aspect.

According to a sixth aspect, a communications system is provided, and includes a network device that performs any method according to the first aspect and a terminal device that performs any method according to the first aspect.

According to the QCL information determining method, the apparatus, and the system provided in the embodiments of the present invention, when the QCL information needs to be determined, the quantity X of pieces of QCL information is first determined, and when it is determined that the quantity X of pieces of QCL information is greater than or equal to 2, the X pieces of QCL information of the antenna port of the data channel are determined. Therefore, the X pieces of QCL information of the antenna port of the data channel may also be determined when at least two network devices or at least two non-QCL antenna panels of a same network device simultaneously send data to the terminal device.

DESCRIPTION OF EMBODIMENTS

Figure 1:
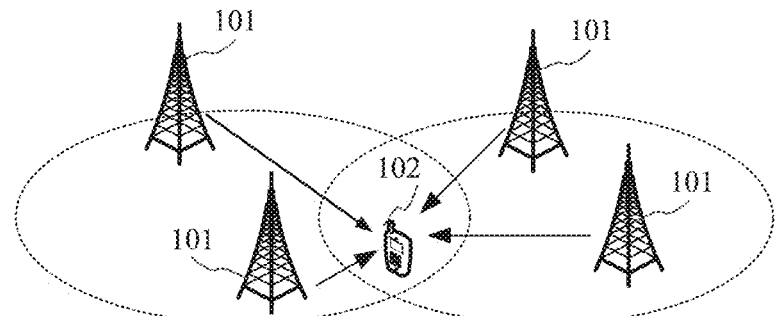
FIG. 1 is a schematic diagram 1 of a communications system according to this application.

The following describes technical solutions of this application with reference to accompanying drawings.

The technical solutions in the embodiments of this application may be applied to various communications systems, for example, a long term evolution (LIT) system, a worldwide interoperability for microwave access (WiMAX) communications system, a future 5th generation (5G) system such as a new generation radio access technology (NR), and a future communications system such as a 6G system.

All aspects, embodiments, or features are presented in this application by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may alternatively be used.

In addition, the term "for example" in the embodiments of this application is used to represent giving an example, an illustration, or a description. Any embodiment or design scheme described as an "example" in this application should not be explained as being more preferred or having more advantages than another embodiment or design scheme. Exactly, the term "for example" is used to present a concept in a specific manner.

In the embodiments of this application, "of", "relevant", and "corresponding" may be interchangeably used sometimes. It should be noted that meanings expressed by the terms are consistent when differences are not emphasized.

In the embodiments of this application, sometimes a subscript in, for example, W1 may be written in an incorrect form such as W1. Expressed meanings are consistent when differences are not emphasized.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and the emergence of new service scenarios, the technical solutions provided in the embodiments of this application are also applicable to similar technical problems.

The embodiments of this application may be applied to a time division duplex (TDD) scenario, or may be applied to a frequency division duplex (FDD) scenario.

The embodiments of this application may be applied to both a conventional typical network and a future network in which user equipment (UE) is used as a center (UE-centric). A non-cell network architecture is introduced to the UE-centric network. To be specific, a large quantity of small cells are deployed in a specific area to form a hyper cell, and each small cell is a transmission point (TP) or a TRP of the hyper cell, and is connected to a centralized controller. When the UE moves in the hyper cell, a network side device selects a new sub-cluster for the UE in real time to serve the UE, to avoid a real cell handover, and implement UE service continuity. The network side device includes a wireless network device. Alternatively, in the UE-centric network, a plurality of network side devices such as small cells may have independent controllers such as distributed controllers. Each small cell can independently schedule a user, and information is exchanged between small cells for a long time, so that the small cell can provide a coordinated service for the UE flexibly to some extent.

In the embodiments of this application, an NR network scenario in a wireless communications network is used to describe some scenarios. It should be noted that the solutions in the embodiments of this application may be further applied to another wireless communications network, and a corresponding name may also be replaced with a name of a corresponding function in the another wireless communications network.

A base station shown in the embodiments of this application may be a device that provides wireless access for the terminal device, and includes but is not limited to an evolved NodeB (eNB), a wireless fidelity access point (Wifi AP), a worldwide interoperability for microwave access base station (WiMAX BS), a base station in the 5G network, or a base station, a transmit and receive point (TRP, transmission and receive point), a transmission point (TP), or the like in another future network.

In the embodiments of this application, different base stations may be base stations having different identifiers, or may be base stations that have a same identifier and that are deployed at different geographical locations. Before a base station is deployed, the base station does not know whether the base station is related to a scenario to which the embodiments of this application are applied. Therefore, before being deployed, the base station or a baseband chip needs to support a method provided in the embodiments of this application. It may be understood that the foregoing base station having different identifiers may have base station identifiers, cell identifiers, or other identifiers.

In the embodiments of this application, the terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in this embodiment of this application may be a mobile phone, a tablet (Pad), a computer with a wireless transceiver function, a virtual reality (VR) terminal device, an augmented reality (AR) terminal device, a wireless terminal in industrial control), a wireless terminal in unmanned driving (self-driving), a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application. In this application, a terminal device having a wireless transceiver function and a chip that may be disposed in the foregoing terminal device are collectively referred to as a terminal device. For ease of understanding the embodiments of this application, communications systems shown in FIG. 1 and FIG. 2 are first used as examples to describe in detail a communications system applicable to the embodiments of this application.

FIG. 1 is a schematic diagram 1 of a communications system according to this application. Referring to FIG. 1, the communications system includes a plurality of network devices 101 and a terminal device 102. The plurality of network devices 101 may simultaneously send data to the terminal device 102. The network device 101 may be configured with a plurality of antennas, and the terminal device 102 may also be configured with a plurality of antennas.

Figure 2:
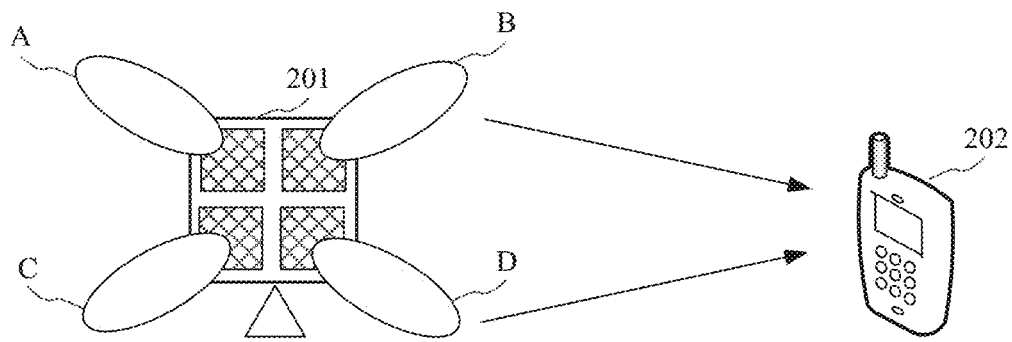
FIG. 2 is a schematic diagram 2 of a communications system according to this application.

FIG. 2 is a schematic diagram 2 of a communications system according to this application. Referring to FIG. 2, the communications system includes a plurality of network devices 201 and a terminal device 202. The network device 201 includes a plurality of antenna panels. For example, referring to FIG. 2, the network device 201 includes four antenna panels, and the four antenna panels are respectively denoted as an antenna panel A, an antenna panel B, an antenna panel C, and an antenna panel D. Antenna ports through which different antenna panels of the network device 201 send signals may be QCL or non-QCL. In this application, the network device 201 simultaneously sends data to the terminal device 202 through at least two non-QCL antenna panels.

It should be understood that the network device 201 may further include a plurality of components (for example, a processor, a modulator, a multiplexer, a demodulator, or a demultiplexer) related to signal sending and receiving.

The network device is a device having a wireless transceiver function or a chip that may be disposed in the device. The device includes but is not limited to an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), or an access point (AP), a wireless relay node, a wireless backhaul node, a network device (transmission and reception point, TRP or transmission point, TP), or the like in a wireless fidelity (Wi-Fi) system, or may be a gNB or a network device (TRP or TP) in a 5G system such as an NR system, or one of or one group (including a plurality of antenna panels) of antenna panels of a base station in a 5G system, or may be a network node such as a baseband unit (BBU) or a distributed unit (DU) that constitutes a gNB or a network device.

In some deployments, the gNB may include a centralized unit (CU) and a DU. The gNB may further include a radio frequency unit (radio unit, RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PRY) layer. Information on the RRC layer eventually becomes information on the PHY layer, or is converted from information on the PHY layer. Therefore, in this architecture, higher layer signaling, such as RRC layer signaling or PHCP layer signaling, may also be considered as being sent by the DU or sent by the DU and the RU. It may be understood that the network device may be a CU node, a DU node, or a device including a CU node and a DU node. In addition, the CU may be classified into a network device in an access network RAN, or the CU may be classified into a network device in a core network CN. This is not limited herein.

It should be noted that FIG. 1 and FIG. 2 merely show, in a form of an example, application scenarios to which a method shown in this application is applicable, and are not intended to limit the application scenarios. In an actual application process, an application scenario to which the method shown in this application is applicable may be determined based on an actual requirement. This is not specifically limited in this application.

When a single network device (for example, the base station or the transmission point) sends data to the terminal device, QCL information of an antenna port is usually determined in the following manner: when a time interval between transmission on a data channel and transmission on a control channel is greater than a threshold, determining whether downlink control information (DCI) includes a TCI field; and if the DCI includes the TCI field, determining the QCL information based on a value in the TCI field; or if the DCI does not include the TCI field, determining a TCI state of the antenna port based on a TCI state of a control channel resource set (control resource set, CORESET) on which downlink control channel (Physical downlink control channel, PDCCH) transmission is located, and determining the QCL information of the antenna port based on the TCI state of the antenna port. When the time interval between transmission on the data channel and transmission on the control channel is less than the threshold, the QCL information of the antenna port is determined based on a TCI state in a CORESET with a smallest number in a latest time unit.

In this application, a case of determining at least two pieces of QCL information is discussed. A possible scenario may be that at least two network devices or at least two non-QCL antenna panels of a same network device simultaneously send data to the terminal device.

In this application, a quantity of pieces of QCL information may be first determined. When it is determined that the quantity of pieces of QCL information is greater than or equal to 2, at least two pieces of QCL information of an antenna port of a data channel may be determined based on a TCI state in a TCI state set according to a preset rule. Therefore, QCL information of at least two antenna ports may be determined when at least two network devices or at least two non-QCL antenna panels of a same network device simultaneously send data to the terminal device.

Optionally, the TCI state set may include one or more TCI states. The TCI state is used to indicate QCL information of an antenna port of a reference signal, and/or used to indicate QCL information of an antenna port of a data channel, and/or used to indicate QCL information of an antenna port of a control channel or QCL information of an antenna port of another signal, or the like. Specifically, this is not limited in this application.

The following describes the technical solutions of this application in detail with reference to specific embodiments. It should be noted that the following several specific embodiments may be independent of each other or may be combined with each other, and same or similar content is not described repeatedly in different embodiments.

Figure 3:
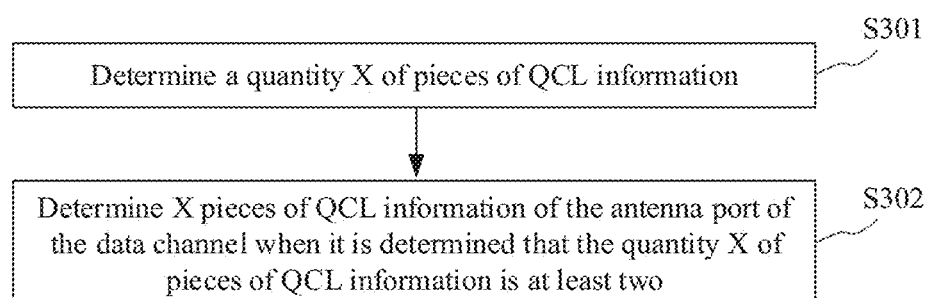
FIG. 3 is a schematic flowchart of a quasi co-location information determining method according to this application.

FIG. 3 is a schematic flowchart of a quasi co-location information determining method according to this application. Referring to FIG. 3, the method may include the following steps.

S301: Determine a quantity X of pieces of QCL information.

Herein, X is a positive integer.

Optionally, the QCL information may be information used to determine a channel large-scale characteristic parameter.

That two antenna ports have a quasi co-location (quasi co-located, QCL) relationship means that a channel large-scale characteristic parameter of one antenna port may be inferred based on a conveyed channel large-scale characteristic parameter of another antenna port. The large-scale characteristic parameter may include one or more of an average gain, an average delay, delay spread, a Doppler frequency shift (Doppler shift), Doppler spread, or a spatial parameter (spatial Rx parameters).

The spatial parameter may include one or more of an angle of arrival (AOA), a dominant angle of arrival (dominant AoA), an average angle of arrival (average AoA), an angle of departure (AOD), a channel correlation matrix, a power angle spread spectrum of the angle of arrival, an average angle of departure (average AoD), a power angle spread spectrum of the angle of departure, a transmit channel correlation, a receive channel correlation, transmit beamforming, receive beamforming, a spatial channel correlation, a spatial filter, a spatial filtering parameter, a spatial reception parameter, weight information, or the like.

Optionally, the QCL information may be further used to indicate a parameter type of a channel. The parameter type of the channel may also be referred to as a QCL type. The parameter type is used to indicate the channel large-scale characteristic parameter.

Optionally, the QCL type includes at least one of a quasi co-location type A (QCL-TypeA), a quasi co-location type B (QCL-TypeB), a quasi co-location type C (QCL-TypeC), or a quasi co-location type D (QCL-TypeD). QCL information corresponding to different QCL types is used to determine different large-scale characteristic parameters. For example, large-scale characteristic parameters determined by using QCL information corresponding to different QCL types may be shown in Table 1.

TABLE I

| QCL, type | Channel large-scale characteristic parameter |
| --- | --- |
| Quasi co-location type A (QCL-TypeA) | Doppler frequency shift, Doppler spread, average delay, and delay spread (Doppler shift, Doppler spread, average delay, and delay spread) |
| Quasi co-location type B (QCL-Type B) | Doppler frequency shift and Doppler spread (Doppler shift and Doppler spread) |
| Quasi co-location type C (QCL-Type C) | Average delay and Doppler shift (average delay and Doppler shift) |
| Quasi co-location type D (QCL-Type D) | Spatial reception parameter (Spatial Rx parameter) |

It should be noted that Table 1 merely shows, in a form of an example, a channel large-scale characteristic parameter determined by using QCL information corresponding to each QCL type, and does not limit the large-scale characteristic parameter determined by using the QCL information corresponding to each QCL type. In an actual application process, the channel large-scale characteristic parameter determined by using the QCL information corresponding to each QCL type may be set based on an actual requirement. This is not specifically limited in this application.

Optionally, when an interval between a time of receiving performed on a data channel and a time of receiving performed on a control channel on which downlink control information corresponding to the data channel is located is less than a threshold, or DCI corresponding to the data channel does not include indication information used to indicate QCL information of an antenna port of a data channel, the quantity of pieces of QCL information may be determined.

When the receiving time interval between the data channel and the control channel on which the downlink control information corresponding to the data channel is located is less than the threshold, because before the data is received through the data channel, DCI corresponding to the data channel is not received through the control channel on which the downlink control information corresponding to the data channel is located, or the corresponding DCI is received, but required information has not been obtained, the terminal device cannot determine the QCL information based on indication information in the DCI corresponding to the data channel. When determining that the DCI corresponding to the data channel does not include the indication information used to indicate the QCL information of the antenna port of the data channel, the terminal device cannot determine the QCL information based on the indication information in the DCI corresponding to the data channel.

Optionally, the DCI corresponding to the data channel is used to indicate scheduling information of the data channel.

Optionally, the indication information used to indicate the QCL information of the antenna port of the data channel may be in a TCI state.

Optionally, the TCI state may be indicated by using QCL configuration information.

Optionally, the TCI may be indicated by using higher layer signaling and/or physical layer signaling. For example, one or more TCI states may be configured by using higher layer signaling, and each TCI state includes a TCI state identifier and TCI information. Further, one of the plurality of TCI states may be indicated by using physical layer signaling. For example, the TCI state may be determined by indicating the TCI state identifier. The higher layer signaling may be other higher layer signaling such as RRC signaling or MAC signaling, and the physical layer signaling may be other physical layer signaling such as downlink control information (DCI). Specifically, this is not limited in this application.

Optionally, the TCI state may not include the TCI state identifier. In this case, the TCI state identifier may be determined according to a predefined rule, for example, may be determined in a configuration sequence of TCI states. For example, a TCI state identifier of a first configured TCI state is TCI 0, a TCI state identifier of a second configured TCI state is TCI 1, and so on.

Optionally, the TCI information may be a configuration of a reference signal set.

Optionally, one TCI state includes a configuration of at least one reference signal set (RS set), for example, TCI-RS-SetConfig, and each TCI-RS-SetConfig includes a configuration parameter of one RS set. For example, the configuration parameter may include an identifier of the RS and a QCL parameter (for example, a QCL type). For example, configuration parameters included in the RS set may be as follows:

{{DL RS ID 1, QCL-Type 1}, {DL RS ID 2, QCL-Type 2}}; or

{DL RS ID 1, QC-Type 1}.

For example, configuration parameters of the RS set in TCI-RS-SetConfig may be as follows:

{{DL RS ID 1, QCL-Type 1}, {DL RS ID 2, QCL-Type 2}}; or

{DL RS ID 1, QC-Type 1}.

For example, configuration parameters of the TCI state may be as follows:

```
TCI state = {
TCI state ID;
TCI-RS-SetConfig0;
TCI-RS-SetConfig1
}
```

Optionally, one TCI state includes a configuration of one reference signal set (RS set), for example, TCI-RS-SetConfig, and each TCI-RS-SetConfig includes a configuration parameter of at least one RS set. For example, the configuration parameter may include an identifier of the RS and a QCL parameter (for example, a QCL type).

For example, configuration parameters included in the RS set may be as follows:

{{DL RS ID 1, QCL-Type 1}, {DL RS ID 2, QCL-Type 2}}; or

{DL RS ID 1, QC-Type 1}.

For example, TCI-RS-SetConfig may include two RS sets, and a configuration parameter of TCI-RS-SetConfig may be as follows:

{{DL RS ID 1, QCL-Type 1}, {DL RS ID 2, QCL-Type 2}}; and

{{DL RS ID 3, QCL-Type 1}, {DL RS ID 4, QCL-Type 2}}.

That is, the first RS set includes the DL RS ID 1 and the DL RS ID 2, and the second RS set includes the DL RS ID 3 and the DL RS ID 4; or {{DL RS ID 1, QCL-Type 1}, {DL RS ID 3, QCL-Type 1}}.

That is, the first RS set includes the DL RS ID 1, and the second RS set includes the DL RS ID 3.

For example, configuration parameters of the TCI state may be as follows:

```
TCI state = {
  TCI state ID;
  TCI-RS-SetConfig
}
```

Optionally, one TCI state includes TCI-RS-SetConfig of at east one reference signal set (RS set), and each TCI-RS-SetConfig includes a configuration parameter of at least one RS set. For example, the configuration parameter may include an identifier of the RS and a QCL parameter (for example, a QCL type).

For example, configuration parameters included in the RS set may be as follows:

{{DL RS ID 1, QCL-Type 1}, {DL RS ID 2, QCL-Type 2}}; or

{DL RS ID 1, QC-Type 1}.

For example, TCI-RS-SetConfig may include two RS sets, and configuration parameters of TCI-RS-SetConfig may be as follows:

{{DL RS ID 1, QCL-Type 1}, {DL RS ID 2, QCL-Type 2}}; and

{{DL RS ID 3, QCL-Type 1}, {DL RS ID 4, QCL-Type 2}}; or

{{DL RS ID 1, QCL-Type 1}, {DL RS ID 3, QCL-Type 1}}. For example, configuration parameters of the TCI state may be as follows:

```
TCI state = {
  TCI state ID;
  TCI-RS-SetConfig0;
  TCI-RS-SetConfig1
}
```

Optionally, the configuration parameter of one RS set may include one or two DL RSs and a quasi co-location type (QCL-Type) corresponding to each DL RS. The quasi co-location type is obtained by configuring a higher layer parameter QCL-Type. When the configuration parameter of one RS set includes two DL RSs, regardless of whether the RSs are a same DL RS or different DL RSs, each DL RS corresponds to a different quasi co-location type.

Optionally, the TCI state may not include the QCL type. In this case, the QCL, type may be determined in a predefined manner. For example, if the configuration parameter of the RS set in the TCI state includes only the identifier of the RS, for example:

TCI-RS-SetConfig: DL RS ID 1.

In this case, a channel large-scale characteristic parameter corresponding to the RS set in the TCI state may be predefined. For example, the large-scale channel parameter is one or more of the Doppler frequency shift, the Doppler spread, the average delay, the delay spread, and the spatial reception parameter. Optionally, S301 may be performed by the terminal device, or may be performed by a network device.

Optionally, a parameter based on which the quantity X of pieces of QCL information is determined may include at least one of the following parameters:

QCL configuration information of the terminal device, an obtained synchronization signal block (Synchronous Signal Block, SSB) feature, an obtained subcarrier spacing, a transmission mode of the terminal device, an obtained DCI feature, an obtained QCL capability, an obtained maximum quantity of pieces of DCI that needs to be detected, a capability of the terminal device, or an obtained data transmission scenario.

On a network device side, the network device determines a relationship between at least one of the foregoing parameters and the determined quantity of pieces of QCL information, and determines, based on a required quantity of pieces of QCL information, at least one of the foregoing parameters corresponding to the quantity of pieces of QCL information. Optionally, the network device may send, to the terminal device, all or some parameters that are in the foregoing parameters and that correspond to the determined quantity of pieces of QCL information, Optionally, during data transmission, the network device may determine the quantity of pieces of QCL information of the antenna port of the data channel based on all or some parameters that are in the foregoing parameters and that are sent to the terminal device. Optionally, the network device may determine the quantity of pieces of QCL information based on a notification from the terminal device.

On a terminal device side, the terminal device determines the quantity of pieces of QCL information of the antenna port of the data channel based on the learned at least one of the foregoing parameters and a relationship between the at least one of the foregoing parameters and the quantity of pieces of QCL information. The terminal device may team of the at least one of the foregoing parameters based on a notification from the network device. Optionally, the terminal device may send the determined quantity of pieces of QCL information to the network device.

Optionally, the relationship between the at least one of the foregoing parameters and the quantity of pieces of QCL information may be all or partially preset in the network device and the terminal device, for example, preset through definition in a protocol, or may be sent by the network device to a terminal, for example, in an explicit indication manner, or may be separately learned of by the network device and the terminal device according to a preset rule (or with reference to other information), for example, in an implicit indication manner.

Optionally, the QCL configuration information includes the indication information used to indicate the QCL information of the antenna port of the reference signal, the indication information includes the QCL type, and the QCL type is used to indicate the QCL parameter.

Optionally, the QCL type includes at least one of a quasi co-location type A (QCL-TypeA), a quasi co-location type B (QCL-TypeB), a quasi co-location type C (QCL-TypeC), or a quasi co-location type D (QCL-TypeD).

Optionally, a QCL parameter indicated by the QCL type may include the channel large-scale characteristic parameter. For the channel large-scale characteristic parameter indicated by different QCL types, refer to Table 1. Details are not described herein again.

It should be noted that when the QCL configuration information of the terminal device is determined by the network device, the network device may send the QCL configuration information of the terminal device to the terminal device.

Optionally, the QCL configuration information may be the TCI state, other configuration information used to indicate the QCL information, or the like. Specifically, this is not limited in this application.

Optionally, the network device may send the QCL configuration information to the terminal device by using radio resource control (RRC) signaling, or may send the QCL configuration information to the terminal device by using medium access control (MAC) signaling. Certainly, the network device may alternatively send the QCL configuration information to the terminal device by using other higher layer signaling or physical layer signaling. This is not limited in this application. Optionally, signaling used to send the QCL configuration information may be predefined, or may be notified by the network device to the terminal device by using signaling. This is not specifically limited in this application.

During channel estimation, an antenna port that has a QCL relationship with the antenna port of the data channel and/or a related QCL parameter may be determined based on the QCL configuration information. The antenna port that has the QCL relationship with the antenna port of the data channel may be one or more of an antenna port of a CSI-RS, an antenna port of an SSB, or an identifier (or an index) of the SSB. The related QCL parameter may be at least one of the foregoing large-scale characteristic parameters or at least one of the foregoing QCL types. For example, the QCL configuration information may include a spatial QCL parameter, or may not include a spatial QCL parameter. Alternatively, the QCL configuration information includes the QCL-TypeD, or may not include the QCL-TypeD. Whether the QCL configuration information includes the spatial QCL parameter or the QCL-TypeD may be determined based on a specific requirement. This is not limited herein.

Optionally, the obtained SSB feature includes a quantity of SSBs transmitted by the network device in one or more time units. Optionally, the time unit may be predefined in a protocol. For example, the time unit may be a timeslot, a subframe, a radio frame, a half frame, 5 ms, 10 ms, or another time unit (type (or length)). Certainly, in an actual application process, a quantity of time units or a type (or a length) of a time unit may be set based on an actual requirement, and a quantity of SSBs transmitted in a time unit may be set based on an actual requirement. This is not specifically limited in this application.

For example, the obtained SSB feature may include a quantity of SSBs transmitted by the network device in N time units. For example, the obtained SSB feature is a quantity of SSBs transmitted by the network device in two radio frames, a quantity of SSBs transmitted in five subframes, or the like. Herein, N may be a positive integer, and a specific value may be notified by the network device to the terminal by using signaling (an explicit indication or an implicit indication), or may be predefined. This is not specifically limited in this application. In this application, the explicit indication means that signaling includes a directly indicated field or field, the implicit indication means that signaling does not include a directly indicated field or field, and the network device and/or the terminal device indirectly obtain a corresponding indication based on a correspondence or a rule and other information. In this application, when it is mentioned that the value is notified by using signaling, if whether the explicit indication or the implicit indication is used is not emphasized, it indicates that the explicit indication or the implicit indication is included. Optionally, whether a specific implementation is the explicit indication or the implicit indication may be determined according to a protocol and is configured in the network device and/or the terminal device, or may be determined in another manner. This is not limited herein.

Optionally, the obtained subcarrier spacing is a subcarrier spacing that is received by the terminal device and that is of a channel that carries data. For example, the subcarrier spacing includes at least one of a subcarrier spacing of remaining minimum system information (RMSI), a subcarrier spacing of an SSB, or a subcarrier spacing of a bandwidth part (MVP). Certainly, the subcarrier spacing may further include another type of subcarrier spacing. This is not specifically limited in this application.

Optionally, when the subcarrier spacing is determined by the network device, the subcarrier spacing may be sent by the network device to the terminal device.

Optionally, the transmission mode may include at least one of single-cell transmission, coordinated transmission, dynamic point selection DPS transmission, or non-coherent joint transmission NCJT. Certainly, in an actual application process, a transmission method of the terminal device may further include another transmission method. This is not specifically limited in this application.

Optionally, the obtained DCI feature is attribute information of the DCI. For example, the DCI feature or the attribute information of the DCI includes at least one of a DCI format, a quantity of bits included in the DCI, a payload size of the DCI, a byte of the DCI, a payload of the DCI, or a feature of a specific field of the DCI. Certainly, the DCI feature or the attribute information of the DCI may further include other information. This is not specifically limited in this application.

Optionally, the feature of the specific field of the DCI may be whether the specific field or a value of the specific field exists in the DCI.

Optionally, the obtained DCI feature may be a DCI feature to be received by the terminal device, a DCI feature corresponding to the terminal device, or the like.

For example, the DCI feature corresponding to the terminal device may be a DCI feature corresponding to the transmission mode of the terminal device or a DCI feature corresponding to data to be received by the terminal device. For example, in a rollback mode, the DCI feature corresponding to the terminal device is a DCI format in the rollback mode, for example, a format 0_0 or a format 1_0.

The DCI format in the rollback mode is a DCI format including a relatively small quantity of DCI bits or a DCI format corresponding to data transmission in a relatively conservative transmission mode such as an open-loop transmission mode or a transmit diversity transmission mode, and is used to reduce DCI overheads and improve transmission performance.

Optionally, DCI formats may include a first format and a second format. The first format is a DCI format used in a first transmission mode, and the first transmission mode includes single-cell transmission. The second format is a DCI format used in a second transmission mode, and the second transmission mode includes one of coordinated transmission, dynamic point selection DPS (or dynamic cell selection DCS) transmission, or non-coherent joint transmission NCJT.

The coordinated transmission may be that at least two network devices coordinately transmit data to the terminal device (which is briefly referred to as a terminal). For example, the at least two network devices may simultaneously transmit the data to the terminal device, and the data may be same data or different data. Alternatively, the at least two network devices may make an overall decision on a beam, precoding, and/or power, and determine a beam, precoding, or power for respective signal transmission. For example, the coordinated transmission may be a related technology or a transmission method in COMP or FeCoMP. Specifically, this is not limited in this application.

For example, in an NR (new radio) system, the first format may include the format 0_0 and the format 1_0, and the second format may include a format 0_1 and a format 1_1. Optionally, the first Format may be a rollback format, and the second format may be a normal format.

For example, in a long term evolution (LTE) system, the first formal may include at least one of a format 1, a format 1A, a format 1B, a format 1C, or a format 1D, and the second format may include at least one of a format 2, a format 2A, a format 2B, a format 2C, or a format 2D. Alternatively, the first format may include at least one of a format 1, a format 1A, a format 1B, a format 1C, a format 1D, a format 2, a format 2A, a format 2B, or a format 2C, and the second format may include a format 2D.

Optionally, the first format may be a DCI format corresponding to at least one of a transmission mode 1 to a transmission mode 9 in Table 2, and the second format may be a DCI format corresponding to a transmission mode 10 in Table 2.

TABLE 2

| Transmission mode | DCI format |
|---|---|
| 1 | Single-antenna transmission (Single-antenna port, for example, a port 0) |
| 2 | Transmit diversity (Transmit diversity) |
| 3 | Open-loop spatial multiplexing and large-delay CDD (Transmit diversity if the associated rank indicator is 1, otherwise large delay CDD) |
| 4 | Closed-loop spatial multiplexing (Closed-loop spatial multiplexing) |
| 5 | Multi-user MIMO (Multi-user MIMO) |
| 6 | Closed-loop spatial multiplexing and single-layer transmission (Closed-loop spatial multiplexing with a single transmission layer) |
| 7 | Transmission with a UE-specific reference signal is performed at a single spatial layer |
| 8 | Dual-stream beamforming: Transmission with a UE-specific reference signal may be performed at twos patial layers |
| 9 | Beamforming of a maximum of eight streams |
| 10 | Support coordinated beamforming of a maximum of eight streams |

Certainly, the first format and the second format may alternatively be DCI formats to be defined in a future communications system. The first format and the second format are not specifically limited in this application.

Optionally, the quantity of bits included in the DCI may be the quantity of bits carried in the DCI, a value of a bit carried in the DCI, the payload size of the DCI, the byte of the DCI, or the payload of the DCI. For example, the quantity of bits included in the DCI may be 24 bits, 40 bits, 56 bits, or the like.

Optionally, the feature of the specific field of the DCI may be whether the specific field or a value of the specific field exists in the DCI. For example, the specific field may be a TCI field. Certainly, in an actual application process, the specific field may be set based on an actual requirement. This is not specifically limited in this application.

It should be noted that when the DCI feature is determined by the network device, the network device may send the DCI feature to the terminal device.

Optionally, the obtained QCL capability may be a quantity of pieces of indication information that is supported by the terminal device and that is used to indicate the QCL information of the antenna port of the reference signal, or a quantity of RS sets associated with the indication information that is supported by the terminal device and that is used to indicate the QCL information of the antenna port of the reference signal.

For example, the QCL capability may mean that the terminal device supports at least two groups of TCI states used to indicate the QCL information of the antenna port of the reference signal or supports one group of TCI states used to indicate the QCL information of the antenna port of the reference signal. Alternatively, the QCL capability may mean that the terminal device supports non-QCL of antenna port groups of different demodulation reference signals (DMRS) or supports QCL of antenna ports of different DMRSs. Alternatively, the QCL capability may mean that a TCI that is supported by the terminal device and that is used to indicate the QCL information of the antenna port of the reference signal includes one group of RS sets or includes at least two groups of RS sets.

Optionally, when the QCL capability is determined by the terminal device, the terminal device may send the QCL capability to the network device.

Optionally, the obtained maximum quantity of pieces of DCI that needs to be detected is a maximum quantity of pieces of DCI that is configured by the network device (for example, a base station) for the terminal device and that needs to be detected by the terminal device, a predefined maximum quantity of pieces of DCI that needs to be detected by the terminal device, or a maximum quantity of pieces of DCI that the terminal device needs to attempt to detect (a maximum quantity of pieces of DCI that may be detected by the terminal). For example, the maximum quantity of pieces of DCI that needs to be detected by the terminal device may be 1, 2, or another value. This is not limited in this application.

Optionally, when the maximum quantity of pieces of DCI that needs to be detected is determined by the network device, the network device may send, to the terminal device, the maximum quantity of pieces of DCI that needs to be detected by the terminal device. Alternatively, when the maximum quantity of pieces of DCI that needs to be detected is determined by the terminal device, the terminal device may send, to the network device, the maximum quantity of pieces of DCI that needs to be detected by the terminal device.

Optionally, the capability of the terminal device may include at least one of a quantity of panels supported by the terminal device, the maximum quantity of pieces of DCI that can be detected by the terminal device, whether the terminal device supports non-coherent joint transmission, a QCL type that can be supported by the terminal device, or a CSI measurement feedback manner that can be supported by the terminal device. Certainly, the capability of the terminal device may further include another information. This is not specifically limited in this application.

Optionally, the capability of the terminal device is usually related to a configuration of the terminal device. In other words, the capability of the terminal device is usually determined by the terminal device, and the terminal device may send the capability of the terminal device to the network device.

Optionally, the obtained data transmission scenario may be a scenario in which it is determined that the quantity of pieces of QCL information is one, a scenario in which it is determined that the quantity of pieces of QCL information is greater than 1, or a scenario in which the quantity of pieces of QCL information cannot be determined.

It should be noted that the foregoing merely shows, in a form of an example, a parameter that can be used to determine the quantity of pieces of QCL information, and does not limit the parameter. In an actual application process, the foregoing parameter may be set based on an actual requirement. This is not specifically limited in this application.

It should be further noted that the quantity of pieces of QCL information may be determined based on one of the foregoing parameters, or the quantity of pieces of QCL information may be determined based on at least two parameters of the foregoing parameters. This is not specifically limited in this application.

S302: Determine X pieces of QCL information of the antenna port of the data channel when it is determined that the quantity X of pieces of QCL information is at least two.

It should be noted that when it is determined that the quantity X of pieces of QCL information is one, the QCL information may be determined in a manner in the prior art. For a specific manner, refer to the prior art. Details are not described in this application.

Optionally, S302 may be performed by the terminal device, or may be performed by the network device.

Optionally, when S302 is performed by the terminal device, the terminal device may determine the X pieces of QCL information of the antenna port of the data channel based on at least one of a first indication information set, a second indication information set, or a third indication information set. Alternatively, the network device may determine the X pieces of QCL information of the antenna port of the data channel based on at least one of a first indication information set, a second indication information set, or a third indication information set, and send the X pieces of QCL information to the terminal device. In other words, the terminal device may obtain the X pieces of QCL information from the network device.

Optionally, when S302 is performed by the network device, the network device may determine the X pieces of QCL information of the antenna port of the data channel based on at least one of a first indication information set, a second indication information set, or a third indication information set.

The first indication information set includes first indication information that is in a CORESET and that is used to indicate QCL information of an antenna port of a downlink control channel.

Optionally, the CORESET may be configured by the network device (for example, the base station) for the terminal device. One CORESET may include at least one piece of first indication information, and each piece of first indication information may be associated with at least one RS set.

Optionally, the CORESET may be a set of time-frequency resources on which control channel transmission is performed. The network device may notify, by using signaling, the terminal device of the set of time-frequency resources on which control channel transmission is performed, that is, configure information about the CORESET, so that the terminal device detects the control channel based on the configuration information. Alternatively, the set of time-frequency resources on which control channel transmission is performed is determined in a predefined manner, and the terminal device may detect the control channel on the set.

Optionally, configuration information of the CORESET may include indication information, and the indication information is used to indicate the quasi co-location information of the antenna port for transmitting the control channel.

Optionally, the first indication information may be in a TCI state. The first indication information may be indication information in the configuration information of the CORESET.

It should be noted that the antenna port of the downlink control channel may be an antenna port of a DMRS of the downlink control channel and/or an antenna port of a phase tracking reference signal (PTRS) of the downlink control channel. The PTRS in this application may be a reference signal used to perform phase tracking, or another reference signal used to perform channel estimation and/or channel demodulation on the data channel or the control channel. A specific name may be not limited to the phase tracking reference signal, and another name may also be used. Specifically, this is not limited in this application.

The DMRS in this application may be a reference signal used to perform data demodulation, or a reference signal used to perform channel estimation and/or channel demodulation on receiving of the data channel, receiving of the control channel, or receiving of another signal. A specific name may be not limited to the demodulation reference signal, and another name may also be used. Specifically, this is not limited in this application.

The second indication information set includes second indication information that is configured by using higher layer signaling and that is used to indicate the QCL information of the antenna port of the reference signal.

Optionally, the second indication information may be indication information that is configured by using RRC signaling and that is used to indicate the QCL information of the antenna port of the reference signal, or may be indication information that is configured (or activated) by using MAC signaling and that is used to indicate the QCL information of the antenna port of the reference signal. Specific indication information to be used may be predefined in a protocol, or may be notified by the network device by using signaling. Specifically, this is not limited in this application.

Optionally, each piece of second indication information may be associated with at least one RS set.

Optionally, the second indication information may be the TCI state. The second indication information may be indication information in the configuration information of the CORESET.

The third indication information set includes third indication information that is in DCI received at a latest moment and that is used to indicate QCL information of an antenna port of a data channel scheduled by using the DCI.

It should be noted that when the terminal device determines the X pieces of QCL information of the antenna port of the data channel based on at least one of the first indication information set, the second indication information set, or the third indication information set, the third indication information set includes the third indication information that is in the DCI received at the latest moment and that is used to indicate the QCL information of the antenna port of the data channel scheduled by using the DCI.

It should be noted that when the terminal device determines the X pieces of QCL information of the antenna port of the data channel based on at least one of the first indication information set, the second indication information set, or the third indication information set, the third indication information set includes the third indication information that is in the DCI received at the latest moment and that is used to indicate the QCL information of the antenna port of the data channel scheduled by using the DCI.

Optionally, the latest moment may alternatively be one or more latest time units. For example, the time unit may be a timeslot, a subframe, a radio frame, a half frame, 5 ms, 10 ms, another time unit, or the like. Certainly, in an actual application process, the time unit may be set based on an actual requirement. This is not specifically limited in this application.

It should be noted that the antenna port of the data channel scheduled by using the DCI may be an antenna port of a DMRS of the data channel and/or an antenna port of a PTRS of the data channel.

The PTRS in this application may be a reference signal used to perform phase tracking, or another reference signal used to perform channel estimation and/or channel demodulation on the data channel or the control channel. A specific name may not be limited to the phase tracking reference signal, and another name may also be used. Specifically, this is not limited in this application. According to the QCL information determining method provided in the embodiments of the present invention, when the QCL information needs to be determined, the quantity X of pieces of QCL information is first determined, and when it is determined that the quantity X of pieces of QCL information is greater than or equal to 2, the X pieces of QCL information of the antenna port of the data channel are determined. Therefore, the X pieces of QCL information of the antenna port of the data channel may also be determined when at least two network devices or at least two non-QCL antenna panels of a same network device simultaneously send data to the terminal device.

Based on any one of the foregoing embodiments, the quantity X of pieces of QCL information may be determined in one or a combination of at least two of the following manners:

Manner 1: Determine the quantity of pieces of QCL information based on whether the QCL configuration information of the terminal device includes the spatial QCL parameter and/or the QCL type D.

Optionally, when it is determined that the QCL configuration information of the terminal device does not include the spatial QCL parameter, it may be determined that the quantity of pieces of QCL information is one.

Optionally, when it is determined that the QCL configuration information of the terminal device includes the spatial QCL parameter, it may be determined that the quantity of pieces of QCL information is E1. Herein, E1 is greater than or equal to 2, and E1 is a preconfigured parameter. For example, E1 may be 2, 3, 4, or the like. In an actual application process, a value of E1 may be set based on an actual requirement.

Optionally, when it is determined that the QCL configuration information of the terminal device does not include the QCL type D, it may be determined that the quantity of pieces of QCL information is one.

Optionally, when it is determined that the QCL configuration information of the terminal device includes the QCL type D, it may be determined that the quantity of pieces of QCL information is E2. Herein, E2 is greater than or equal to 2, and E2 is a preconfigured parameter.

For example, E2 may be 2, 3, 4, or the like. In an actual application process, a value of E2 may be set based on an actual requirement.

Manner 2: Determine the quantity of pieces of QCL information based on an obtained quantity of SSBs transmitted by the network device in N time units, where N is a positive integer.

Optionally, the quantity of pieces of QCL information may be determined based on a value relationship between a first threshold and a quantity of SSBs transmitted by a transmission point in the N time units. For example, when a quantity of SSBs transmitted by the network device in a time unit is less than the first threshold, it may be determined that the quantity of pieces of QCL information is one. When a quantity of SSBs transmitted by the network device in a time unit is greater than or equal to the first threshold, it may be determined that the quantity of pieces of QCL information is E3. Alternatively, when a quantity of SSBs transmitted by the network device in a time unit is less than or equal to the first threshold, it may be determined that the quantity of pieces of QCL information is one. When a quantity of SSBs transmitted by the network device in a time unit is greater than the first threshold, it may be determined that the quantity of pieces of QCL information is E3. Herein, E3 is greater than or equal to 2, and E3 is a preconfigured parameter. For example, E3 may be 2, 3, 4, or the like, in an actual application process, a value of E3 may be set based on an actual requirement.

Optionally, when a quantity of SSBs transmitted by the network device in a time unit is less than or equal to the first threshold, it may be determined that the quantity of pieces of QCL information is one. When a quantity of SSBs transmitted by the network device in a time unit is greater than another threshold, it may be determined that the quantity of pieces of QCL information is E3. E3 is greater than or equal to two. The first threshold and the another threshold may have different values. Specifically, this is not limited in this application.

Optionally, in this application, different thresholds may be used to determine the quantity of pieces of QCL information if there are different quantities. Specifically, this is not limited in this application.

Optionally, the quantity of pieces of QCL information may also be determined based on a range to which the quantity of SSBs transmitted by the network device in the time unit belongs. Different ranges correspond to different quantities of pieces of QCL information. For example, when the quantity of SSBs falls in a first range, it is determined that the quantity of pieces of QCL information is one. When the quantity of SSBs falls in a second range, it is determined that the quantity of pieces of QCL information is two. When the quantity of SSBs falls in a third range, it is determined that the quantity of pieces of QCL information is three.

For example, assuming that the time unit is five ms, when a quantity of SSBs transmitted by the network device within five ms ranges from one to four (the first range), it is determined that the quantity of pieces of QCL information is one. When a quantity of SSBs transmitted by the network device within five ms ranges from five to eight (the second range), it is determined that the quantity of pieces of QCL information is two. When a quantity of SSBs transmitted by the network device within five ms ranges from nine to 16 (the third range), it is determined that the quantity of pieces of QCL information is three.

It should be noted that the foregoing merely shows, in a form of an example, each range and a quantity of pieces of QCL information that corresponds to each range, and does not limit this. In an actual application process, each range and the quantity of pieces of QCL information that corresponds to each range may be set based on an actual requirement.

Manner 3: Determine the quantity of pieces of QCL information based on the obtained subcarrier spacing.

Optionally, the quantity of pieces of QCL information may be determined based on a value relationship between the obtained subcarrier spacing and a second threshold. For example, when the obtained subcarrier spacing is less than the second threshold, it may be determined that the quantity of pieces of QCL information is one. When the obtained subcarrier spacing is greater than or equal to the second threshold, it may be determined that the quantity of pieces of QCL information is E4. Alternatively, when the obtained subcarrier spacing is less than or equal to the second threshold, it may be determined that the quantity of pieces of QCL information is one. When the obtained subcarrier spacing is greater than the second threshold, it may be determined that the quantity of pieces of QCL information is E4. Herein, E4 is greater than or equal to 2, and E4 is a preconfigured parameter. For example, E4 may be 2, 3, 4, or the like. In an actual application process, a value of E4 may be set based on an actual requirement.

Optionally, when the obtained subcarrier spacing is greater than or equal to the second threshold, it may be determined that the quantity of pieces of QCL information is E4. Alternatively, when the obtained subcarrier spacing is less than or equal to another threshold, it may be determined that the quantity of pieces of QC, information is one. The second threshold and the another threshold may have different values. Specifically, this is not limited in this application.

Optionally, different thresholds may be used to determine the quantity of pieces of QCL information if there are different quantities. Specifically, this is not limited in this application.

For example, it is assumed that the second threshold is 60 kHz. When the subcarrier spacing is less than 60 kHz, it is determined that the quantity of pieces of QCL information is one. When the subcarrier spacing is greater than or equal to 60 kHz, it is determined that the quantity of pieces of QCL information is two.

Optionally, the quantity of pieces of QCL information may also be determined based on a range to which the subcarrier spacing belongs. Different ranges correspond to different quantities of pieces of QCL information. For example, when the obtained subcarrier spacing falls in a first range, it is determined that the quantity of pieces of QCL information is one. When the obtained subcarrier spacing falls in a second range, it is determined that the quantity of pieces of QCL information is two. When the obtained subcarrier spacing falls in a third range, it is determined that the quantity of pieces of QCL information is three.

For example, it is assumed that the subcarrier spacing is a subcarrier spacing of a BWP. When the subcarrier spacing of the BWP is from 15 kHz to 30 kHz (the first range), it is determined that the quantity of pieces of QCL information is one. When the subcarrier spacing of the BWP is from 60 kHz to 120 kHz (the second range), it is determined that the quantity of pieces of QCL information is two. When the subcarrier spacing of the BWP is from 120 kHz or more than 120 kHz (the third range), it is determined that the quantity of pieces of QCL information is three.

It should be noted that the foregoing merely shows, in a form of an example, each range and a quantity of pieces of QCL information that corresponds to each range, and does not limit this. In an actual application process, each range and the quantity of pieces of QCL information that corresponds to each range may be set based on an actual requirement.

Manner 4: Determine the quantity of pieces of QCL information based on the transmission mode of the terminal device.

Optionally, when the transmission mode of the terminal device is the first transmission mode, it is determined that the quantity of pieces of QCL information is one. The first transmission mode includes single-cell transmission. Certainly, in an actual application process, the first transmission mode may be set based on an actual requirement. This is not specifically limited in this application.

Optionally, when the transmission mode of the terminal device is the second transmission mode, it is determined that the quantity of pieces of QCL information is E5. Herein, E5 is greater than or equal to 2, and E5 is a preconfigured parameter. For example, E5 may be 2, 3, 4, or the like. In an actual application process, a value of E5 may be set based on an actual requirement. The second transmission mode includes at least one of coordinated transmission, dynamic point selection (DPS) transmission, or non-coherent joint transmission (NCJT). Certainly, in an actual application process, the second transmission mode may be set based on an actual requirement. This is not specifically limited in this application.

Manner 5: Determine the quantity of pieces of QCL information based on the obtained DCI format.

Optionally, the obtained DCI format may be a DCI format to be received by the terminal device, a DCI format corresponding to the terminal device, or the like. This is not limited in this embodiment of this application.

Optionally, when a DCI format obtained by the terminal device is the first format, it is determined that the quantity of pieces of QCL information is one.

Optionally, when a DCI format obtained by the terminal device is the second format, it is determined that the quantity of pieces of QCL information is E6. Herein, E6 is greater than or equal to 2, and E6 is a preconfigured parameter. For example, E6 may be 2, 3, 4, or the like. In an actual application process, a value of E6 may be set based on an actual requirement.

Manner 6: Determine the quantity of pieces of QCL information based on the obtained quantity of bits of the DCI, the payload size of the DCI, the byte of the DCI, or the payload of the DCI.

Optionally, the obtained quantity of bits of the DCI may alternatively be a quantity that is of bits of the DCI to be received by the terminal device, a quantity that is of bits of the DCI corresponding to the terminal device, or the like. This is not limited in this embodiment of this application.

Optionally, the quantity of pieces of QCL information may be determined based on a value relationship between the obtained quantity of bits of the DCI and a third threshold. For example, when the obtained quantity of bits of the DCI is less than or equal to the third threshold, it is determined that the quantity of pieces of QCL information is one. When the obtained quantity of bits of the DCI is greater than the third threshold, it is determined that the quantity of pieces of QCL information is E7. Alternatively, when the obtained quantity of bits of the DCI is less than the third threshold, it is determined that the quantity of pieces of QCL information is one. When the obtained quantity of bits of the DCI is greater than or equal to the third threshold, it is determined that the quantity of pieces of QCL information is E7. Herein, E7 is greater than or equal to 2, and E7 is a preconfigured parameter. For example, E7 may be 2, 3, 4, or the like. In an actual application process, a value of E7 may be set based on an actual requirement.

Optionally, when the obtained quantity of bits of the DCI is less than the third threshold, it is determined that the quantity of pieces of QCL information is one. When the obtained quantity of bits of the DCI is greater than or equal to another threshold, it is determined that the quantity of pieces of QCL information is E7. Herein, E7 is greater than or equal to two. The third threshold and the another threshold may have different values. Specifically, this is not limited in this application.

Optionally, in this application, different thresholds may be used to determine the quantity of pieces of QCL information if there are different quantities. Specifically, this is not limited in this application.

In this application, the control channel may carry control information. For example, the downlink control channel may carry downlink control information, for example, DCI. The control information and the control channel may also be used together without special emphasis on a difference.

Optionally, the quantity of pieces of QCL information may also be determined based on a relationship between the obtained quantity of bits of the DCI and a preset quantity of bits. For example, when the quantity of bits of the DCI is A1, it may be determined that the quantity of pieces of QCL information is one; or when the quantity of bits of the DCI is A2, it may be determined that the quantity of pieces of QCL information is two. Herein, A1 and A2 are positive integers.

For example, a value of A1 may be 24 bits, a value of A2 may be 40 bits, 56 bits, or the like. Alternatively, A1 and A2 each may be a DCI payload size (a control information payload size) defined in NR, a control information payload size defined in a future communications system, or the like. This is not limited in this application.

Optionally, the quantity of pieces of QCL information may also be determined based on a range to which the obtained quantity of bits of the DCI belongs. Different ranges correspond to different quantities of pieces of QCL information. For example, when the obtained quantity of bits of the DCI falls in a first range, it is determined that the quantity of pieces of QCL information is one. When the obtained quantity of bits of the DCI falls in a second range, it is determined that the quantity of pieces of QCL information is two. When the obtained quantity of bits of the DCI falls in a third range, it is determined that the quantity of pieces of QCL information is three.

For example, when the quantity of bits of the DCI is less than or equal to 24 bits (the first range), it may be determined that the quantity of pieces of QCL information is one. For example, when the quantity of bits of the DCI is from 25 bits to 40 bits (the second range), it may be determined that the quantity of pieces of QCL information is two. When the quantity of bits of the DCI is from 41 bits to 56 bits (the third range), it may be determined that the quantity of pieces of QCL information is three.

It should be noted that the foregoing merely shows, in a form of an example, each range and a quantity of pieces of QCL information that corresponds to each range, and does not limit this. In an actual application process, each range and the quantity of pieces of QCL information that corresponds to each range may be set based on an actual requirement.

Manner 7: Determine the quantity of pieces of QCL information based on the obtained feature of the specific field of the DCI.

The feature of the specific field of the DCI may be whether the specific field or a value of the specific field exists in the DCI.

Optionally, the quantity of pieces of QCL information may be determined based on whether a specific field exists in the DCI. For example, when no specific field exists in the DCI, it is determined that the quantity of pieces of QCL information is one; or when a specific field exists in the DCI, it is determined that the quantity of pieces of QCL information is E13. Herein, E13 is greater than or equal to 2, and E13 is a preconfigured parameter. For example, E13 may be 2, 3, 4, or the like. In an actual application process, a value of E13 may be set based on an actual requirement.

Optionally, the quantity of pieces of QCL information may also be determined based on the value of the specific field of the DCI. There is a preset correspondence between a value of a specific field of DCI and a quantity of pieces of QCL information. For example, when the value of the specific field is one, it may be determined that the quantity of pieces of QCL information is one; or when the value of the specific field is two, it may be determined that the quantity of pieces of QCL information is two. Certainly, in an actual application process, the preset correspondence between a value of a specific field of DCI and a quantity of pieces of QCL information may be set based on an actual requirement. This is not specifically limited in this application.

Manner 8: Determine the quantity of pieces of QCL information based on the quantity of pieces of indication information that is supported by the terminal device and that is used to indicate the QCL information of the antenna port of the reference signal, and/or the quantity of RS sets associated with the indication information that is supported by the terminal device and that is used to indicate the QCL information of the antenna port of the reference signal.

Optionally, if the quantity of pieces of indication information that is supported by the terminal device and that is used to indicate the QCL information of the antenna port of the reference signal is one, and a quantity of RS sets associated with one piece of indication information supported by the terminal device is also one, it may be determined that the quantity of pieces of QCL, information is one. If the quantity of pieces of indication information that is supported by the terminal device and that is used to indicate the QCL information of the antenna port of the reference signal is greater than one, or the quantity of RS sets associated with the indication information supported by the terminal device is greater than one, it may be determined that the quantity of pieces of QCL information is E8. Herein, E8 is greater than or equal to 2, and E8 is a preconfigured parameter. For example, E8 may be 2, 3, 4, or the like. In an actual application process, a value of E8 may be set based on an actual requirement.

Optionally, when a quantity of pieces of indication information that is supported by the terminal device and that is used to indicate the QCL information of the antenna port of the reference signal is greater than 1, or the quantity of RS sets associated with the indication information supported by the terminal device is greater than 1, the quantity of pieces of QCL information may be determined based on a range to which the total quantity of RS sets associated with the indication information supported by the terminal device belongs. Different ranges correspond to different quantities of pieces of QCL information. For example, when the total quantity of RS sets associated with the indication information supported by the terminal device falls within a first range, it is determined that the quantity of pieces of QCL information is one. When the total quantity of RS sets associated with the indication information supported by the terminal device falls within a second range, it is determined that the quantity of pieces of QCL information is two. When the total quantity of RS sets associated with T pieces of indication information supported by the terminal device falls within a third range, it is determined that the quantity of pieces of QCL information is three.

For example, assuming that the indication information is a TCI state, when a total quantity of RS sets associated with a TCI state supported by the terminal device is one (the first range), it may be determined that the quantity of pieces of QCL information is one. When a total quantity of RS sets associated with a TCI state supported by the terminal device is two (the second range), it may be determined that the quantity of pieces of QCL information is two. When a total quantity of RS sets associated with a TCI state supported by the terminal device is three (the third range), it may be determined that the quantity of pieces of QCL information is three.

It should be noted that the foregoing merely shows, in a form of an example, each range and a quantity of pieces of QCL information that corresponds to each range, and does not limit this. In an actual application process, each range and the quantity of pieces of QCL information that corresponds to each range may be set based on an actual requirement.

Manner 9: Determine the quantity of pieces of QCL information based on the maximum quantity of pieces of DCI that needs to be detected.

Optionally, if the maximum quantity of pieces of DCI that needs to be detected is one, it is determined that the quantity of pieces of QCL information is one. If the maximum quantity of pieces of DCI that needs to be detected is greater than one, it is determined that the quantity of pieces of QCL information is $E9$. Herein, $E9$ is greater than or equal to 2, and $E9$ may be a preconfigured parameter. For example, $E9$ may be 2, 3, 4, or the like. In an actual application process, a value of $E9$ may be set based on an actual requirement.

Optionally, the maximum quantity of pieces of DCI that needs to be detected by the terminal device may be notified by the network device to the terminal, or may be determined by the terminal according to a preset rule. This is not limited in this application.

Optionally, the maximum quantity of pieces of DCI that needs to be detected by the terminal device may be greater than or equal to a quantity of pieces of DCI actually detected by the terminal device. To be specific, the network device may notify the terminal that the maximum quantity of pieces of DCI that needs to be detected is two, or the terminal device may determine that the maximum quantity of pieces of DCI that needs to be detected is two, but the terminal actually detects only one piece of DCI.

Optionally, the quantity of pieces of QCL information may also be determined based on a range to which the maximum quantity of pieces of DCI that needs to be detected belongs. Different ranges correspond to different quantities of pieces of QCL information. For example, when the maximum quantity of pieces of DCI that needs to be detected by the terminal device falls in a first range, it is determined that the quantity of pieces of QCL information is one. When the maximum quantity of pieces of DCI that needs to be detected by the terminal device falls in a second range, it is determined that the quantity of pieces of QCL information is two. When the maximum quantity of pieces of DCI that needs to be detected by the terminal device falls in a third range, it is determined that the quantity of pieces of QCL information is three.

For example, when the maximum quantity of pieces of DCI that needs to be detected by the terminal device is one (the first range), it may be determined that the quantity of pieces of QCL information is one. When the maximum quantity of pieces of DCI that needs to be detected by the terminal device is two (the second range), it may be determined that the quantity of pieces of QCL information is two. When the maximum quantity of pieces of DCI that needs to be detected by the terminal device is three (the third range), it may be determined that the quantity of pieces of QCL information is three.

It should be noted that the foregoing merely shows, in a form of an example, each range and a quantity of pieces of QCL information that corresponds to each range, and does not limit this. In an actual application process, each range and the quantity of pieces of QCL information that corresponds to each range may be set based on an actual requirement.

Manner 10: Determine the quantity of pieces of QCL information based on the maximum quantity of pieces of DCI that can be detected by the terminal device.

Optionally, if the maximum quantity of pieces of DCI that can be detected by the terminal device is one, it is determined that the quantity of pieces of QCL information is one. If the maximum quantity of pieces of DCI that can be detected by the terminal device is greater than one, it is determined that the quantity of pieces of QCL information is $E10$. Herein, $E10$ is greater than or equal to 2, and $E10$ is a preconfigured parameter. For example, $E10$ may be 2, 3, 4, or the like. In an actual application process, a value of $E10$ may be set based on an actual requirement.

Optionally, the quantity of pieces of QCL information may also be determined based on a range to which the maximum quantity of pieces of DCI that can be detected by the terminal device belongs. Different ranges correspond to different quantities of pieces of QCL information. For example, when the maximum quantity of pieces of DCI that can be detected by the terminal device falls in a first range, it is determined that the quantity of pieces of QCL information is one. When the maximum quantity of pieces of DCI that can be detected by the terminal device falls in a second range, it is determined that the quantity of pieces of QCL information is two. When the maximum quantity of pieces of DCI that can be detected by the terminal device falls in a third range, it is determined that the quantity of pieces of QCL information is three.

For example, when the maximum quantity of pieces of DCI that can be detected by the terminal device is one (the first range), it may be determined that the quantity of pieces of QCL information is one. When the maximum quantity of pieces of DCI that can be detected by the terminal device is two (the second range), it may be determined that the quantity of pieces of QCL information is two. When the maximum quantity of pieces of DCI that can be detected by the terminal device is three (the third range), it may be determined that the quantity of pieces of QCL information is three.

It should be noted that the foregoing merely shows, in a form of an example, each range and a quantity of pieces of QCL information that corresponds to each range, and does not limit this. In an actual application process, each range and the quantity of pieces of QCL information that corresponds to each range may be set based on an actual requirement.

Manner 11: Determine the quantity of pieces of QCL information based on the quantity of panels supported by the terminal device.

Optionally, if the quantity of panels supported by the terminal device is one, it is determined that the quantity of pieces of QCL information is one. If the quantity of panels supported by the terminal device is greater than one, it is determined that the quantity of pieces of QCL information is $E11$. Herein, $E11$ is greater than or equal to 2, and $E11$ is a preconfigured parameter. For example, $E11$ may be 2, 3, 4, or the like. In an actual application process, a value of E11 may be set based on an actual requirement.

Optionally, the quantity of pieces of QCL information may also be determined based on a range to which the quantity of panels supported by the terminal device belongs. Different ranges correspond to different quantities of pieces of QCL information. For example, when the quantity of panels supported by the terminal device falls in a first range, it is determined that the quantity of pieces of QCL information is one. When the quantity of panels supported by the terminal device falls in a second range, it is determined that the quantity of pieces of QCL information is two. When the quantity of panels supported by the terminal device falls in a third range, it is determined that the quantity of pieces of QCL information is three.

For example, when the quantity of panels supported by the terminal device is one (the first range), it may be determined that the quantity of pieces of QCL information is one. When the quantity of panels supported by the terminal device is two (the first range), it may be determined that the quantity of pieces of QCL information is two. When the quantity of panels supported by the terminal device is greater than two (the first range), it may be determined that the quantity of pieces of QCL information is three.

It should be noted that the foregoing merely shows, in a form of an example, each range and a quantity of pieces of QCL information that corresponds to each range, and does not limit this. In an actual application process, each range and the quantity of pieces of QCL information that corresponds to each range may be set based on an actual requirement.

Manner 12: Determine the quantity of pieces of QCL information based on the obtained data transmission scenario.

Optionally, when the data transmission scenario is that it is determined that the quantity of pieces of QCL information is one, it is determined that the quantity of pieces of QCL information is one. When the data transmission scenario is that the quantity of pieces of QCL information cannot be determined, or the data transmission scenario is that it is determined that the quantity of pieces of QCL information is greater than 1, it is determined that the quantity of pieces of QCL information is E12. Herein, E12 is greater than or equal to 2, and E12 is a preconfigured parameter. For example, E12 may be 2, 3, 4, or the like. In an actual application process, a value of E12 may be set based on an actual requirement.

Optionally, the data transmission scenario may be determined based on at least one of the QCL configuration information, an SSB transmission feature, or subcarrier spacing information. It should be noted that for a process of determining the data transmission scenario, refer to a process of determining the quantity of pieces of QCL information based on at least one of the QCL configuration information, the SSB transmission feature, or the subcarrier spacing information. Details are not described herein again.

It should be noted that in an actual application process, the quantity of pieces of QCL information may be determined in one of the foregoing manners, or the quantity of pieces of QCL information may be determined in a combination of at least two of the foregoing manners.

Optionally, in a process of determining the quantity of pieces of QCL information in a combination of at least two manners, only when it is determined, in each of the at least two manners, that the quantity of pieces of QCL information is X, it can be determined that the quantity of pieces of QCL information is X, where X is a positive integer. For example, in a combination of Manner 1 and Manner 2, the quantity of pieces of QCL information can be determined as 1 only when the quantity of pieces of QCL information is determined as 1 in Manner 1 and the quantity of pieces of QCL information may be determined as 1 in Manner 2. The quantity of pieces of QCL information can be determined as 2 only when the quantity of pieces of QCL information is determined as 2 in Manner 1 and the quantity of pieces of QCL information is determined as 2 in Manner 2.

Optionally, the quantity X of the QCL information may be determined as 1 in the following feasible implementation: when it is determined that the parameter meets at least one of the following conditions, the quantity X of pieces of QCL, information may be determined as 2:

the QCL configuration information of the terminal device does not include a spatial QCL parameter or does not include a QCL type D;

an obtained quantity of SSBs transmitted by the network device in N time units is less than or equal to the first threshold, and N is a positive integer;

the obtained subcarrier spacing is less than or equal to the second threshold;

the transmission mode of the terminal device is the first transmission mode, and the first transmission mode includes single-cell transmission;

the obtained DCI format is the first format, and the first format is a DCI format used in the first transmission mode;

the obtained quantity of bits of the DCI is less than or equal to the third threshold; an obtained DCI does not include the specific field, or the value of the specific field of the obtained DCI belongs to a specific range (including a unique specific value);

the quantity of pieces of indication information that is supported by the terminal device and that is used to indicate the QCL, information of the antenna port of the reference signal is one, and the quantity of RS sets associated with the indication information that is supported by the terminal device and that is used to indicate the QCL information of the antenna port of the reference signal is one;

the maximum quantity of pieces of DCI that needs to be detected is one; the maximum quantity of pieces of DCI that can be detected by the terminal device is one;

the quantity of panels supported by the terminal device is one; and the data transmission scenario is that it is determined that the quantity of pieces of QCL information is one.

Optionally, the quantity X of the QCL: information may be determined as 2 in the following feasible implementation: When it is determined that the parameter meets at least one of the following conditions, the quantity X of pieces of QCL information may be determined as 2:

the QCL configuration information of the terminal device includes the spatial QCL parameter, or includes the QCL type D;

the obtained quantity of SSBs transmitted by the network device in the N time units is greater than or equal to the first threshold, and N is a positive integer;

the obtained subcarrier spacing is greater than or equal to the second threshold;

the transmission mode of the terminal device is the second transmission mode, and the second transmission mode includes one of coordinated transmission, dynamic point selection DPS transmission, or non-coherent joint transmission NCJT;

the obtained DCI format is the second format, and the second format is the DCI format used in the second transmission mode:

the obtained quantity of bits of the DCI is greater than or equal to the third threshold; the obtained DCI includes the specific field, or the value of the specific field of the obtained DCI belongs to a specific range (including a unique specific value);

the quantity of pieces of indication information that is supported by the terminal device and that is used to indicate the QCL information of the antenna port of the reference signal is at least two;

the quantity of RS sets associated with the indication information that is supported by the terminal device and that is used to indicate the QCL information of the antenna port of the reference signal is at least two;

the maximum quantity of pieces of DCI that needs to be detected is greater than 1;

the maximum quantity of pieces of DCI that can be detected by the terminal device is greater than 1;

the quantity of panels supported by the terminal device is greater than 1; and the data transmission scenario is a scenario in which the quantity of pieces of QCL information cannot be determined, or it is determined that the quantity of pieces of QCL information is greater than 1.

Optionally, values of the first threshold, the second threshold, and/or the third threshold that are/is used to determine that the quantity X of pieces of QCL information is greater than or equal to 2 may be the same as or different from values of the first threshold, the second threshold, and/or the third threshold that are/is used to determine that the quantity X of pieces of QCL information is one. This is not limited herein.

It should be noted that the quantity of pieces of QCL information may alternatively be determined as 3, 4, or the like in the foregoing similar manner. Details are not described again in this application.

Based on any one of the foregoing embodiments, the X pieces of QCL information may be determined in one or a combination of at least two of the following manners:

Manner 1: Determine A pieces of QCL information in the X pieces of QCL information of the antenna port of the data channel based on the first indication information set, where A is a positive integer, and A is less than or equal to X.

Optionally, A meets Formula 1:

$$A = \Sigma_{m=1}^{m=M}(\Sigma_{k=1}^{k=n_m} Y_{m,k}) \qquad \text{Formula 1}$$

Herein, M is a total quantity of CORESETs with the smallest identifier, m is the $m^{th}$ CORESET in the CORESETs with the smallest identifier, and k is the $k^{th}$ indication information in the $m^{th}$ CORESET in the CORESETs with the smallest identifier, $Y_{m,k}$ is a quantity of RS sets associated with the $k^{th}$ indication information in the $m^{th}$ CORESET in the CORESETs with the smallest identifier, and $n_m$ is a quantity of pieces of indication information in the $m^{th}$ CORESET in the CORESETs with the smallest identifier. The first indication information set includes the indication information in the foregoing formula, and a quantity of pieces of indication information in the foregoing formula is $\Sigma_{m=1}^{m=M} n_m$.

Optionally, at least two pieces of indication information in the foregoing formula are the same.

Optionally, the indication information in the foregoing formula is different.

Optionally, at least two RS sets in the foregoing formula are the same.

Optionally, the RS sets in the foregoing formula are different. That the RS sets are different may include that at least one RS identifier ID in the RS set is different, and/or at least one QCL type is different.

Optionally, the M CORESETs with the smallest identifier are M CORESETs with the smallest identifier that are configured for the terminal device in the latest one or more time units. For example, the time unit may be a slot, a subframe, a radio frame, a half frame, 5 ms, 10 ms, or another time unit. Optionally, the latest one or more time units belong to one time window, and a size of the time window may be defined in a protocol and is preset in the terminal device or the network device, or may be notified by the network device to the terminal device, or may be determined by the network device and the terminal device according to a rule. This is not limited herein.

Optionally, the M CORESETs with the smallest identifier are M CORESETs with the smallest identifier in CORESETs configured for the terminal device.

Optionally, when A is equal to X, the X pieces of QCL information may be determined in only Manner 1.

Optionally, when A is less than X, the X pieces of QCL information may be determined in a combination of Manner 1 and at least one of the other two manners. For example, the A pieces of QCL information are determined in Manner 1, and the other X-A pieces of QCL information are determined in the at least one of the other two manners.

Optionally, the first indication information in the first indication information set meets a first rule, and the first rule includes at least one of the following four rules:

Rule 1: First indication information in A CORESETs with smallest identifiers, where each of the A CORESETs includes one piece of first indication information, and each piece of first indication information is associated with one RS set.

Optionally, an identifier of a CORESET may be configured by the network device by using higher layer signaling. For example, the network device may configure the identifier of the CORESET by using RRC signaling.

Optionally, indication information in the CORESET may be indication information in a CORESET other than a common search space or a common CORESET.

Optionally, the indication information in the CORESET may be indication information in a CORESET corresponding to a terminal-specific (UE-specific) search space.

Optionally, the A CORESETs with the smallest identifier may be determined from CORESETs received by the terminal device in the latest one or more time units (or CORESETs sent by the network device in the latest one or more time units). For example, the time unit may be a timeslot, a subframe, a radio frame, a half frame, 5 ms, 10 ms, another time unit, or the like.

Optionally, the A CORESETs with the smallest identifier may be determined front CORESETs that are configured for the terminal device and that need to be detected in the latest one or more time units. For example, the time unit may be a timeslot, a subframe, a radio frame, a half frame, 5 ms, 10 ms, another time unit, or the like.

Optionally, the A CORESETs with the smallest identifier may alternatively be determined from all CORESETs received by the terminal device (or all CORESETs sent by the network device).

It should be noted that first indication information included in different CORESETs in the A CORESETs may be the same or may be different.

For example, it is assumed that the indication information is a TCI state, and the first indication information set is a first TCI state set. It is further assumed that an identifier of a CORESET, a TCI state in each CORESET, and an RS set associated with each TCI state are shown in Table 3.

TABLE 3

| CORESET | TCI state in a CORESET | RS set associated with a TCI state |
| --- | --- | --- |
| CORESET 0 | TCI 0 | RS set 0 |
| CORESET 1 | TCI 1 | RS set 1 |
| CORESET 2 | TCI 2 | RS set 2 |
| ... | ... | ... |

It is assumed that A is two. The CORESET 0 and the CORESET 1 each include only one TCI state, and each TCI state is associated with only one RS set. Therefore, TCI states (the TCI 0 in the CORESET 0 and the TCI 1 in the CORESET 1) in A=2 CORESETs (the CORESET and the CORESET 1) with smallest numbers are determined as TCI states in the first TCI state set. In this case, the A=2 CORESETs (the CORESET 0 and the CORESET 1) include different TCI states.

For example, it is assumed that the indication information is a TCI state, and the first indication information set is a first TCI state set. It is further assumed that a number (which is also referred to as an identifier or an index) of a CORESET, a TCI state in each CORESET, and an RS set associated with each TCI state are shown in Table 4.

TABLE 4

| CORESET | TCI state in a CORESET | RS set associated with a TCI state |
| --- | --- | --- |
| CORESET 0 | TCI 0 | RS set 0 |
| CORESET 1 | TCI 1 | RS set 0 |
|  | TCI 2 | RS set 1 |
| CORESET 2 | TCI 0 | RS set 2 |
| CORESET 3 | TCI 4 | RS set 3 |
| ... | ... | ... |

It is assumed that A is three. The CORESET 0, the CORESET 2, and the CORESET 3 each include only one TCI state, and each TCI state is associated with only one RS set. Therefore, TCI states (the TCI 0 in the CORESET 0, the TCI 0 in the CORESET 2, and the TCI 4 in the CORESET 3) in A=3 CORESETs (the CORESET 0, the CORESET 2, and the CORESET 3) with smallest numbers are determined as TCI states in the first TCI state set. In this case. TCI states included in the A=3 CORESETs (the CORESET 0, the CORESET 1, and the CORESET 2) include a same TCI state.

Rule 2: First indication information in A CORESETs with smallest identifiers, where each of the A CORESETs includes one piece of first indication information, different CORESETs in the A CORESETs include different first indication information, and each piece of first indication information is associated with one RS set.

Optionally, the A CORESETs with the smallest identifier may be determined from CORESETs received by the terminal device in the latest one or more time units (or CORESETs sent by the network device in the latest one or more time units). For example, the time unit may be a timeslot, a subframe, a radio frame, a half frame, 5 ms, 10 ms, another time unit, or the like.

Optionally, the A CORESETs with the smallest identifier may be determined from CORESETs that are configured for the terminal device and that need to be detected in the latest one or more time units. For example, the time unit may be a timeslot, a subframe, a radio frame, a half frame, 5 ms, 10 ms, another time unit, or the like.

Optionally, the A CORESETs with the smallest identifier may alternatively be determined from all CORESETs received by the terminal device (or all CORESETs sent by the network device).

For example, it is assumed that the indication information is a TCI state, and the first indication information set is a first TCI state set. It is further assumed that a number of a CORESET, a TCI state in each CORESET, and an RS set associated with each TCI state are shown in Table 5.

TABLE 5

| CORESET | TCI state in a CORESET | RS set associated with a TCI state |
| --- | --- | --- |
| CORESET 0 | TCI 0 | RS set 0 |
| CORESET 1 | TCI 0 | RS set 0 |
| CORESET 2 | TCI 1 | RS set 1 |
| ... | ... | ... |

It is assumed that A is two. The CORESET 0 and the CORESET 2 each include only one TCI state, each TCI state is associated with only one RS set, and the CORESET 0 and the CORESET 2 include different TCI states. Therefore, TCI states (the TCI 0 in the CORESET 0 and the TCI 1 in the CORESET 2) in A=2 CORESETs (the CORESET 0 and the CORESET 2) that have smallest numbers and that include different TCI states are determined as TCI states in the first TCI state set. In this case, the A=2 CORESETs (the CORESET 0 and the CORESET 2) include different TCI states.

Rule 3: A pieces of first indication information in P CORESETs with smallest identifiers, where at least one of the P CORESETs includes at least two pieces of first indication information, P is a positive integer and is less than A, each piece of first indication information is associated with one RS set and P is positive integer greater than or equal to 1.

Optionally, the P CORESETs with the smallest identifier may be determined from CORESETs received by the terminal device in the latest one or more time units (or CORESETs sent by the network device in the latest one or more time units). For example, the time unit may be a timeslot, a subframe, a radio frame, a half frame, 5 ms, 10 ms, another time unit, or the like.

Optionally, the P CORESETs with the smallest identifier may be determined from CORESETs that are configured for the terminal device and that need to be detected in the latest one or more time units. For example, the time unit may be a timeslot, a subframe, a radio frame, a half frame, 5 ms, 10 ms, another time unit, or the like.

Optionally, the P CORESETs with the smallest identifier may alternatively be determined from all CORESETs received by the terminal device (or all CORESETs sent by the network device).

For example, it is assumed that the indication information is a TCI state, and the first indication information set is a first TCI state set. It is further assumed that a number of a CORESET, a TCI state in each CORESET, and an RS set associated with each TCI state are shown in Table 6.

TABLE 6

| CORESET | TCI state in a CORESET | RS set associated with a TCI state |
|---|---|---|
| CORESET 0 | TCI 0 | RS set 0 |
| CORESET 1 | TCI 0 | RS set 0 |
|  | TCI 1 | RS set 1 |
| CORESET 2 | TCI 2 | RS set 2 |
|  | TCI 3 | RS set 3 |
| ... | ... | ... |

It is assumed that A is two. The CORESET 1 includes two TCI states. Therefore, TCI states (the TCI 0 in the CORESET 1 and the TCI 1 in the CORESET 1) in P=1 CORESET (the CORESET 1) with a smallest number are determined as TCI states in the first TCI state set.

For example, it is assumed that the indication information is a TCI state, and the first indication information set is a first TCI state set. It is further assumed that a number of a CORESET, a TCI state in each CORESET, and an RS set associated with each TCI state are shown in Table 7.

TABLE 7

| CORESET | TCI state in a CORESET | RS set associated with a TCI state |
|---|---|---|
| CORESET 0 | TCI 0 | RS set 0 |
| CORESET 1 | TCI 0 | RS set 0 |
|  | TCI 1 | RS set 1 |
| CORESET 2 | TCI 2 | RS set 2 |
|  | TCI 3 | RS set 3 |
| ... | ... | ... |

It is assumed that A is three. The CORESET 0 includes one TCI state, and the CORESET 1 includes two TCI states. Therefore, TCI states (the TCI 0 in the CORESET 0, the TCI 1 in the CORESET 1, and the TCI 1 in the CORESET 1) in P=2 CORESETs (the CORESET 0 and the CORESET 1) with smallest numbers are determined as TCI states in the first TCI state set.

Rule 4: Y pieces of first indication information in Q CORESETs with smallest identifiers, where all or some first indication information (for example, at least one piece of first indication information) included in the Q CORESETs is associated with at least two reference signal sets RS sets, Q is a positive integer and is less than A, and Y is a positive integer and is less than A.

Optionally, the Q CORESETs with the smallest identifier may be determined from CORESETs received by the terminal device in the latest one or more time units (or CORESETs sent by the network device in the latest one or more time units). For example, the time unit may be a timeslot, a subframe, a radio frame, a half frame, 5 ms, 10 ms, another time unit, or the like.

Optionally, the Q CORESETs with the smallest identifier may alternatively be determined from all CORESETs received by the terminal device (or all CORESETs sent by the network device).

For example, it is assumed that the indication information is a TCI state, and the first indication information set is a first TCI state set. It is further assumed that a number of a CORESET, a TCI state in each CORESET, and an RS set associated with each TCI state are shown in Table 8.

TABLE 8

| CORESET | TCI state in a CORESET | RS set associated with a TCI state |
|---|---|---|
| CORESET 0 | TCI 0 | RS set 0 |
| CORESET 1 | TCI 1 | RS set 0 and RS set 1 |
| CORESET 2 | TCI 2 | RS set 2 |
|  | TCI 3 | RS set 3 |
| ... | ... | ... |

It is assumed that A is two. The TCI 1 in the CORESET 1 is associated with two RS sets. Therefore, Y=1 TCI state (the TCI 1) in Q=1 CORESET (the CORESET 1) with a smallest number is determined as a TCI state in the first TCI state set.

For example, it is assumed that the indication information is a TCI state, and the first indication information set is a first TCI state set. It is further assumed that a number of a CORESET, a TCI state in each CORESET, and an RS set associated with each TCI state are shown in Table 9.

TABLE 9

| CORESET | TCI state in a CORESET | RS set associated with a TCI state |
|---|---|---|
| CORESET 0 | TCI 0 | RS set 0 |
| CORESET 1 | TCI 1 | RS set 0 and RS set 1 |
| CORESET 2 | TCI 2 | RS set 2 |
|  | TCI 3 | RS set 3 |
| ... | ... | ... |

It is assumed that A is three. The TCI 0 in the CORESET 0 is associated with one RS set, and the TCI 1 in the CORESET 1 is associated with two RS sets, Therefore, Y=2 TCI states (the TCI 0 in the CORESET 0 and the TCI 1 in the CORESET 1) in Q=2 CORESETs (the CORESET 0 and the CORESET 1) with smallest numbers are determined as TCI states in the first TCI state set.

Optionally, the first rule may be defined in a protocol and is preset in the terminal device or the network device, or may be notified by the network device to the terminal device, or may be determined by the network device and the terminal device according to a rule. This is not limited herein.

It should be noted that the foregoing merely shows the first rule in a form of an example, and does not limit the first rule. In an actual application process, the first rule may be set based on an actual requirement. This is not specifically limited in this application.

Manner 2: Determine B pieces of QCL information in the X pieces of QCL information of the antenna port of the data channel based on the second indication information set. Herein, B is a positive integer, and B is less than or equal to X.

Optionally, B meets Formula 2:

$$B = \sum_{d=1}^{d=D} Z_d \qquad \text{Formula 2}$$

Herein, D is a total quantity of pieces of second indication information with smallest identifiers, d is the $d^{th}$ second indication information in the second indication information with the smallest identifiers, and $Z_d$ is a quantity of RS sets associated with the $d^{th}$ second indication information in the second indication information with the smallest identifiers. The second indication information set includes indication information in the foregoing formula, and a quantity of pieces of indication information in the foregoing formula is D.

Optionally, at least two pieces of indication information in the foregoing formula are the same.

Optionally, the indication information in the foregoing formula is different.

Optionally, at least two RS sets in the foregoing formula are the same.

Optionally, the RS sets in the foregoing formula are different. That the RS sets are different may include that at least one RS identifier ID in the RS set is different, and/or at least one QCL type is different.

Optionally, the second indication information is a TCI state.

Optionally, when B is equal to X, the X pieces of QCL information may be determined in only Manner 2.

Optionally, when B is less than X, the X pieces of QCL information may be determined in a combination of Manner 2 and at least one of other two manners. For example, the B pieces of QCL information are determined in Manner 2, and the other X-B pieces of QCL information are determined in the at least one of the other two manners.

Optionally, the second indication information in the second indication information set meets a second rule, and the second rule includes at least one of the following two rules:

Rule 1: B pieces of second indication information with smallest identifiers, where each piece of second indication information is associated with one RS set.

For example, it is assumed that the second indication information is a second TCI state, and the second indication information set is a second TCI state set. It is further assumed that the second TCI state and an RS set associated with each second TCI state are shown in Table 10.

TABLE 10

| Second TCI state | RS set associated with a second TCI state |
|---|---|
| TCI 0 | RS set 0 |
| TCI 1 | RS set 1 |
| TCI 2 | RS set 2 |
| TCI 3 | RS set 3 |
| TCI 4 | RS set 4 |
| . . . | . . . |

It is assumed that B is two. The TCI 0 is associated with one RS set, and the TCI 1 is associated with one RS set. Therefore, B=2 second TCI states (the TCI 0 and the TCI 1) with smallest numbers may be determined as TCI states in the second TCI state set.

For example, it is assumed that the indication information is a TCI state, and the second indication information set is a second TCI state set. It is further assumed that the second TCI state and an RS set associated with each second TCI state are shown in Table 11.

TABLE 11

| Second TCI state | RS set associated with a second TCI state |
|---|---|
| TCI 0 | RS set 0 |
| TCI 1 | RS set 0 |
|  | RS set 1 |

TABLE 11-continued

| Second TCI state | RS set associated with a second TCI state |
|---|---|
| TCI 2 | RS set 1 |
| TCI 3 | RS set 2 |
| TCI 4 | RS set 3 |
| . . . | . . . |

It is assumed that B is three. The TCI 0 is associated with one RS set, the TCI 2 is associated with one RS set, and the TCI 3 is associated with one RS set. Therefore, B=3 predefined TCI states (the TCI 0, the TCI 2, and the TCI 3) with smallest numbers may be determined as TCI states in the second TCI state set.

Rule 2: K pieces of second indication information with smallest identifiers, where all or some second indication information (for example, at least one piece of second indication information) in the K pieces of second indication information is associated with at least two RS sets, and K is a positive integer and is less than B.

For example, it is assumed that the indication information is a TCI state, and the second indication information set is a second TCI state set. It is further assumed that the second TCI state and an RS set associated with each second TCI state are shown in Table 12.

TABLE 12

| Second TCI state | RS set associated with a second TCI state |
|---|---|
| TCI 0 | RS set 0 |
| TCI 1 | RS set 0 |
|  | RS set 1 |
| TCI 2 | RS set 1 |
|  | RS set 2 |
| TCI 3 | RS set 3 |
| TCI 4 | RS set 4 |
| . . . | . . . |

It is assumed that B is two. The TCI 1 is associated with two RS sets. Therefore, K=1 second TCI state (the TCI 1) with a smallest number may be determined as a TCI state in the second TCI state set.

For example, it is assumed that the indication information is a TCI state, and the second indication information set is a second TCI state set. It is further assumed that the second TCI state and an RS set associated with the second TCI state are shown in Table 13.

TABLE 13

| Second TCI state | Second RS set |
|---|---|
| TCI 0 | RS set 0 |
| TCI 1 | RS set 0 |
|  | RS set 1 |
| TCI 2 | RS set 1 |
|  | RS set 2 |
| TCI 3 | RS set 3 |
| TCI 4 | RS set 4 |
| . . . | . . . |

It is assumed that B is three. The TCI 0 is associated with one RS set, and the TCI 1 is associated with two RS sets. Therefore, K=2 second TCI states (the TCI 0 and the TCI 1) with smallest numbers may be determined as TCI states in the second TCI state set.

Optionally, the second indication information in the second indication information set may be indication information configured by using RRC signaling, or may be indication information activated by using MAC signaling. Optionally, a determining rule of the second indication information may be notified by the network device to the terminal device by using signaling, or may be predefined in a protocol. This is not limited in this application.

Optionally, the second rule may be defined in a protocol and is preset in the terminal device or the network device, or may be notified by the network device to the terminal device, or may be determined by the network device and the terminal device according to a rule. This is not limited herein.

It should be noted that the foregoing merely shows the second rule in a form of an example, and does not limit the second rule. In an actual application process, the second rule may be set based on an actual requirement. This is not specifically limited in this application.

Manner 3: Determine C pieces of QCL information in the X pieces of QCL information of the antenna port of the data channel based on the third indication information set, where C is a positive integer, and C is less than or equal to X.

Optionally, C meets Formula 3:

$$C = \Sigma_{h=1}^{h=H}(\Sigma_{t=1}^{t=n_h} Y_{h,t}) \qquad \text{Formula 3}$$

Herein, H is a total quantity of pieces of DCI received (or sent) at a latest moment, h is the $h^{th}$ DCI in the DCI received (or sent) at the latest moment, t is the $t^{th}$ indication information in the $h^{th}$ DCI in the DCI received (or sent) at the latest moment, $Y_{h,t}$ is a quantity of RS sets associated with the $t^{th}$ indication information in the $h^{th}$ DCI in the DCI received (or sent) at the latest moment, and $n_h$ is a quantity of pieces of indication information in the $h^{th}$ DCI in the DCI received (or sent) at the latest moment. The third indication information set includes indication information m the foregoing formula, and a quantity of pieces of indication information in the foregoing formula is $\Sigma_{h=1}^{h=H} n_h$.

It should be noted that, on a terminal device side, the foregoing parameters are all received at the latest moment. On the network device side, the foregoing parameters are all parameters sent at the latest moment.

Optionally, at least two pieces of indication information in the foregoing formula are the same.

Optionally, the indication information in the foregoing formula is different.

Optionally, at least two RS sets in the foregoing formula are the same.

Optionally, the RS sets in the foregoing formula are different. That the RS sets are different may include that at least one RS identifier ID in the RS set is different, and/or at least one QCL type is different.

The DCI received (or sent) at the latest moment may be DCI received (or sent) at the latest one or more moments, for example, may be DCI received (or sent) in the latest one or more time units. The time unit may be a timeslot, a subframe, a radio frame, a half frame, 5 ms, 10 ms, another time unit, or the like. Optionally, the latest one or more moments may belong to one time window, and a size of the time window may be defined in a protocol and is preset in the terminal device or the network device, or may be notified by the network device to the terminal device, or may be determined by the network device and the terminal device according to a rule. This is not limited herein.

Optionally, when C is equal to X, the X pieces of QCL information may be determined in only Manner 1.

Optionally, when C is less than X, the X pieces of QCL information may be determined in a combination of Manner 3 and at least one of other two manners. For example, the C pieces of QCL information are determined in Manner 3, and the other X-C pieces of QCL information are determined in the at least one of the other two manners.

Optionally, the third indication information in the third indication information set meets a third rule, and the third rule includes at least one of the following four rules:

Rule 1: Third indication information in C pieces of DCI received (or sent) at the latest moment, where each of the C pieces of DCI includes one piece of third indication information, and each piece of third indication information is associated with one RS set.

It should be noted that the third indication information included in the C pieces of DCI may be the same or may be different.

For example, it is assumed that the indication information is a TCI state, and the third indication information set is a third TCI state set. It is further assumed that an identifier of DCI received at the latest moment, a TCI state in the DCI, and an RS set associated with each TCI state are shown in Table 14. A smaller identifier of DCI indicates DCI received at a later moment.

TABLE 14

| Identifier of DCI | TCI state | RS set associated with a TCI state |
|---|---|---|
| DCI 0 | TCI 0 | RS set 0 |
| DCI 1 | TCI 1 | RS set 1 |
| DCI 2 | TCI 2 | RS set 2 |
| DCI 3 | TCI 3 | RS set 3 |
| DCI 4 | TCI 4 | RS set 4 |
| . . . | . . . | . . . |

It is assumed that C is two. The DCI 0 and the DCI 1 each include one TCI state, and each TCI state is associated with one RS set. Therefore, TCI states (the TCI 0 in the DCI 0 and the TCI 1 in the DCI 1) in C=2 pieces of DCI received at the latest moment may be determined as TCI states in the third TCI state set. In this case, the C=2 pieces of DCI (the DCI 0 and the DCI 1) include different TCI states.

For example, it is assumed that the indication information is a TCI state, and the third indication information set is a third TCI state set. It is further assumed that an identifier of DCI received at the latest moment, a TCI state in the DCI, and an RS set associated with each TCI state are shown in Table 15.

TABLE 15

| Identifier of DCI | TCI state | RS set associated with a TCI state |
|---|---|---|
| DCI 0 | TCI 0 | RS set 0 |
| DCI 1 | TCI 1 | RS set 0 |
| DCI 2 | TCI 2 | RS set 1 |
|  |  | RS set 2 |
| DCI 3 | TCI 1 | RS set 3 |
| DCI 4 | TCI 4 | RS set 4 |
| . . . | . . . | . . . |

It is assumed that C is three. The DCI 0, the DCI 1, and the DCI 3 each include one TCI state, and each TCI state is associated with one RS set. Therefore, TCI states (the TCI 0 in the DCI 0, the TCI 1 in the DCI 1, and the TCI 1 in the DCI 3) in C=3 pieces of DCI received at the latest moment may be determined as TCI states in the third TCI state set. In this case, TCI states included in C=2 pieces of DCI (the DCI 0, the DCI 1, and the DCI 3) include a same TCI state.

Rule 2: Third indication information in C pieces of DCI received (or sent) at the latest moment. Each of the C pieces of DCI includes one piece of third indication information, different DCI in the C pieces of DCI includes different third indication information, and each piece of third indication information is associated with one reference signal set.

For example, it is assumed that the indication information is a TCI state, and the third indication information set is a third TCI state set. It is further assumed that an identifier of DCI received at the latest moment, a TCI state in the DCI, and an RS set associated with each TCI state are shown in Table 16.

TABLE 16

| Identifier of DCI | TCI state | RS set associated with a TCI state |
|---|---|---|
| DCI 0 | TCI 0 | RS set 0 |
| DCI 1 | TCI 1 | RS set 0 |
| DCI 2 | TCI 2 | RS set 1 |
|  |  | RS set 2 |
| DCI 3 | TCI 3 | RS set 3 |
| DCI 4 | TCI 5 | RS set 4 |
| ... | ... | ... |

It is assumed that C is two. The DCI 0 and the DCI 1 each include one TCI state, each TCI state is associated with one RS set, and the DCI 0 and the DCI 1 include different TCI states. Therefore, TCI states (the TCI 2 in the DCI 0 and the TCI 1 in the DCI 1) in C=2 pieces of DCI received at the latest moment may be determined as TCI states in the third TCI state set.

For example, it is assumed that the indication information is a TCI state, and the third indication information set is a third TCI state set. It is further assumed that a TCI state in DCI received at the latest moment and an RS set associated with each TCI state are shown in Table 17.

TABLE 17

| DCI | TCI state | RS set associated with a TCI state |
|---|---|---|
| DCI 0 | TCI 0 | RS set 0 |
| DCI 1 | TCI 1 | RS set 0 |
| DCI 2 | TCI 2 | RS set 1 |
|  | TCI 3 | RS set 2 |
| DCI 3 | TCI 3 | RS set 3 |
|  |  | RS set 4 |
| DCI 4 | TCI 1 | RS set 4 |
| DCI 5 | TCI 4 | RS set 4 |
| ... | ... | ... |

It is assumed that C is three. The DCI 0, the DCI 1, and the DCI 5 each include one TCI state, each TCI state is associated with one RS set, and the DCI 0, the DCI 1, and the DCI 5 include different TCI states. Therefore, TCI states (the TCI 0 in the DCI 0, the TCI 1 in the DCI 1, and the TCI 4 in the DCI 5) in C=3 pieces of DCI received at the latest moment may be determined as TCI states in the third TCI state set.

Rule 3: C pieces of third indication information in K pieces of DCI received (or sent) at the latest moment, where all or some (for example, at least one piece of) DCI in the K pieces of DCI includes at least two pieces of third indication information, K is a positive integer and is less than C, and each piece of third indication information is associated with one reference signal set.

For example, it is assumed that the indication information is a TCI state, and the third indication information set is a third TCI state set. It is further assumed that an identifier of DCI received at the latest moment, a TCI state in the DCI, and an RS set associated with each TCI state are shown in Table 18.

TABLE 18

| Identifier of DCI | TCI state | RS set associated with a TCI state |
|---|---|---|
| DCI 0 | TCI 0 | RS set 0 |
| DCI 1 | TCI 1 | RS set 0 |
| DCI 2 | TCI 2 | RS set 1 |
|  | TCI 3 | RS set 2 |
| DCI 3 | TCI 1 | RS set 3 |
| DCI 4 | TCI 4 | RS set 4 |
| ... | ... | ... |

It is assumed that C is two. The DCI 2 includes two TCI states, and each TCI state is associated with one RS set. Therefore, TCI states (the TCI 2 in the DCI 2 and the TCI 3 in the DCI 2) in K=1 piece of DCI (the DCI 2) received at the latest moment may be determined as TCI states in the third TCI state set.

For example, it is assumed that the indication information is a TCI state, and the third indication information set is a third TCI state set. It is further assumed that an identifier of DCI received at the latest moment, a TCI state in the DCI, and an RS set associated with each TCI state are shown in Table 19.

TABLE 19

| Identifier of DCI | TCI state | RS set associated with a TCI state |
|---|---|---|
| DCI 0 | TCI 0 | RS set 0 |
| DCI 1 | TCI 1 | RS set 0 |
| DCI 2 | TCI 2 | RS set 1 |
|  | TCI 3 | RS set 2 |
| DCI 3 | TCI 1 | RS set 3 |
| DCI 4 | TCI 4 | RS set 4 |
| ... | ... | ... |

It is assumed that C is three. The DCI 1 includes one TCI state, the DCI 2 includes two TCI states, and each TCI state is associated with one RS set. Therefore, TCI states (the TCI 1 in the DCI 1, the TCI 2 in the DCI 2, and the TCI 3 in the DCI 2) in K=2 pieces of DCI (the DCI 1 and the DCI 2) received at the latest moment may be determined as TCI states in the third TCI state set.

Rule 4: Z pieces of third indication information in T pieces of DCI received (or sent) at the latest moment, where all or some third indication information (for example, at least one piece of third indication information) in the T pieces of DCI is associated with at least two reference signal sets RS sets, T is a positive integer and is less than C, and Z is a positive integer and is less than C.

All or some DCI (for example, at least one piece of DCI) in the T pieces of DCI may include at least one piece of third indication information.

For example, it is assumed that the indication information is a TCI state, and the third indication information set is a third TCI state set. It is further assumed that an identifier of DCI received at the latest moment, a TCI state in the DCI, and an RS set associated with each TCI state are shown in Table 20.

TABLE 20

| Identifier of DCI | TCI state | RS set associated with a TCI state |
| --- | --- | --- |
| DCI 0 | TCI 0 | RS set 0 |
| DCI 1 | TCI 1 | RS set 0 |
| DCI 2 | TCI 2 | RS set 1 |
|  |  | RS set 2 |
| DCI 3 | TCI 1 | RS set 3 |
| DCI 4 | TCI 4 | RS set 4 |
| . . . | . . . | . . . |

It is assumed that C is two. The TCI 2 included in the DCI 2 is associated with two RS sets. Therefore, Z=1 TCI state (the TCI 2 in the DCI 2) in T=1 piece of DCI (the DCI 2) received at the latest moment may be determined as a TCI state in the third TCI state set.

For example, it is assumed that the indication information is a TCI state, and the third indication information set is a third TCI state set. It is further assumed that an identifier of DCI received at the latest moment, a TCI state in the DCI, and an RS set associated with each TCI state are shown in Table 21.

TABLE 21

| Identifier of DCI | TCI state | RS set associated with a TCI state |
| --- | --- | --- |
| DCI 0 | TCI 0 | RS set 0 |
| DCI 1 | TCI 1 | RS set 0 |
| DCI 2 | TCI 2 | RS set 1 |
|  |  | RS set 2 |
| DCI 3 | TCI 1 | RS set 3 |
| DCI 4 | TCI 4 | RS set 4 |
| . . . | . . . | . . . |

It is assumed that C is three. The TCI 1 included in the DCI 1 is associated with one RS set, and the TCI 2 included in the DCI 2 is associated with two RS sets. Therefore, Z=2 TCI states (the TCI 1 in the DCI 1 and the TCI 2 in the DCI 2) in K=2 pieces of DCI (the DCI 1 and the DCI 2) received at the latest moment may be determined as TCI states in the third TCI state set.

Optionally, the third rule may be defined in a protocol and is preset in the terminal device or the network device, or may be notified by the network device to the terminal device, or may be determined by the network device and the terminal device according to a rule. This is not limited herein.

It should be noted that the foregoing merely shows the third rule in a form of an example, and does not limit the third rule. In an actual application process, the third rule may be set based on an actual requirement. This is not specifically limited in this application.

Optionally, the QCL information may be determined based on a TCI state in DCI received in one time window, or the QCL information may be determined based on a TCI state in DCI received in a plurality of time windows. The time window may be predefined in a protocol, or may be notified by the network device to the terminal device. Specifically, this is not limited in this application.

For example, assuming that the quantity of pieces of QCL information is two, and assuming that DCI recently received by the terminal device in a time window includes one TCI state, and the TCI state is associated with two RS sets, two pieces of QCL information may be determined based on the TCI state.

For example, assuming that the quantity of pieces of QCL information is two, assuming that DCI received by the terminal device at the latest moment in a first time window includes one TCI state, and the TCI state is associated with one RS set (which is assumed to be a CSI-RS resource 1), and assuming that DCI detected by the terminal device in a second time window includes one TCI state, and the TCI state is associated with two RS sets (which are assumed to be a CSI-RS resource 0 and a CSI-RS resource 2), two pieces of QCL information may be determined based on two RS sets (the CSI-RS resource 1 and the CSI-RS resource 0) associated with the two TCI states.

It should be noted that the X pieces of QCL information of the antenna port of the data channel may be determined based on one, two, or three of the first indication information set, the second indication information set, or the third indication information set. The following separately describes, in Example 1, a process of determining the X pieces of QCL information based on one indication information set, describes, in Example 2, a process of determining the X pieces of QCL information based on two indication information sets, and describes, in Example 3, a process of determining the X pieces of QCL information based on the three indication information sets.

Example 1: Determine the X pieces of QCL information based on one indication information set.

The indication information set is the first indication information set, X is two, and the first rule is Rule 1 in the four rules shown in Manner 1. The indication information is a TCI state, and a CORESET configured by the network device by using higher layer signaling such as RRC is shown in Table 22.

TABLE 22

| CORESET | TCI state in a CORESET | RS set associated with a TCI state |
| --- | --- | --- |
| CORESET 0 | TCI 0 | RS set 0 |
| CORESET 1 | TCI 1 | RS set 1 |
| CORESET 2 | TCI 2 | RS set 2 |
| . . . | . . . | . . . |

X=2, the CORESET 0 and the CORESET 1 each include only one TCI state, and each TCI state is associated with only one RS set. Therefore, TCI states (the TCI 0 in the CORESET 0 and the TCI 1 in the CORESET 1) in A=2 CORESETs (the CORESET 0 and the CORESET 1) with smallest numbers are determined as TCI states in the first TCI state set.

One piece of QCL information is determined based on the RS set 0 associated with the TCI 0 in the first TCI state set, and the other piece of QCL information is determined based on the RS set 1 associated with the TCI 1.

Example 2: Determine the X pieces of QCL information based on two indication information sets.

The two indication information sets are the first indication information set and the second indication information set, and X is two. One piece of QCL information (A=1) is determined based on indication information in the first indication information set, and the other piece of QCL information (B=1) is determined based on indication information in the second indication information set. For example, the first rule is Rule 1 in the four rules shown in Manner 1. The second rule is Rule 1 in the two rules shown in Manner 2. For example, the indication information is a TCI state, and a CORESET configured by the network device by using RRC is shown in Table 23.

TABLE 23

| CORESET | TCI state in a CORESET | RS set associated with a TCI state |
|---|---|---|
| CORESET 0 | TCI 1-0 | RS set 1-0 |
| CORESET 1 | TCI 1-1 | RS set 1-1 |
| CORESET 2 | TCI 1-2 | RS set 1-2 |
| ... | ... | ... |

A=1, the CORESET 0 includes only one TCI state (TCI 1-0), and the TCI 1-0 is associated with only one RS set. Therefore, it may be determined that the first TCI state set includes the TCI 1-0.

The second TCI state is shown in Table 24.

TABLE 24

| Second TCI state | RS set associated with a TCI state |
|---|---|
| TCI 2-0 | RS set 2-0 |
| TCI 2-1 | RS set 2-1 |
| TCI 2-2 | RS set 2-2 |
| TCI 2-3 | RS set 2-3 |
| TCI 2-4 | RS set 2-4 |
| ... | ... |

B=1, the TCI 2-0 is associated with only one RS set. Therefore, it may be determined that the second TCI state set includes the TCI 2-0.

The first TCI state set includes the TCI 1-0, and the second TCI state set includes the TCI 2-0. Therefore, one piece of QCL information may be determined based on the RS set 1-0 associated with the TCI 1-0, and the other piece of QCL information may be determined based on the RS set 2-0 associated with the TCI 2-0.

Example 3: Determine the X pieces of QCL information based on the three indication information sets.

The three indication information sets are the first indication information set, the second indication information set, and the third indication information set, and X is three. One piece of QCL information (A=1) is determined based on indication information in the first indication information set, one piece of QCL information (B=1) is determined based on indication information in the second indication information set, and the other piece of QCL information (C=1) is determined based on indication information in the third indication information set. For example, the first rule is Rule 1 in the four rules shown in Manner 1. The second rule is Rule 1 in the two rules shown in Manner 2. The third rule is Rule 1 in the four rules shown in Manner 3. For example, the indication information is a TCI state, and a CORESET configured by the network device by using RRC is shown in Table 25.

TABLE 25

| CORESET | TCI state in a CORESET | RS set associated with a TCI state |
|---|---|---|
| CORESET 0 | TCI 1-0 | RS set 1-0 |
| CORESET 1 | TCI 1-1 | RS set 1-1 |
| CORESET 2 | TCI 1-2 | RS set 1-2 |
| ... | ... | ... |

A=1, the CORESET 0 includes only one TCI state (TCI 1-0), and the TCI 1-0 is associated with only one RS set. Therefore, it may be determined that the first TCI state set includes the TCI 1-0.

The second TCI state is shown in Table 26.

TABLE 26

| Second TCI state | RS set associated with a TCI state |
|---|---|
| TCI 2-0 | RS set 2-0 |
| TCI 2-1 | RS set 2-1 |
| TCI 2-2 | RS set 2-2 |
| TCI 2-3 | RS set 2-3 |
| TCI 2-4 | RS set 2-4 |
| ... | ... |

B=1, the TCI 2-0 is associated with only one RS set. Therefore, it may be determined that the second TCI state set includes the TCI 2-0.

The identifier of the DCI received at the latest moment, the TCI state in the DCI, and the RS set associated with each TCI state are shown in Table 27.

TABLE 27

| Identifier of DCI | TCI state | RS set associated with a TCI state |
|---|---|---|
| DCI 0 | TCI 3-0 | RS set 3-0 |
| DCI 1 | TCI 3-1 | RS set 3-0 |
| DCI 2 | TCI 3-2 | RS set 3-1 |
|  |  | RS set 3-2 |
| DCI 3 | TCI 3-1 | RS set 3-3 |
| DCI 4 | TCI 3-4 | RS set 3-4 |
| ... | ... | ... |

C=1, the DCI 0 includes one TCI state (TCI 3-0), and the TCI 3-0 is associated with only one RS set, Therefore, it may be determined that the third TCI state set includes the TCI The first TCI state set includes the TCI 1-0, the second TCI state set includes the TCI 2-0, and the TCI state set includes the TCI 3-0. Therefore, one piece of QCL information may be determined based on the RS set 1-0 associated with the TCI 1-0, one piece of QCL information may be determined based on the RS set 2-0 associated with the TCI 2-0, and the other piece of QCL information may be determined based on the RS set 3-0 associated with the TCI 3-0.

The foregoing describes in detail the quasi co-location information determining method shown in this application with reference to FIG. 2 and FIG. 3. The following describes an apparatus and a device in the embodiments of this application in detail with reference to FIG. 4 to FIG. 6.

Figure 4:
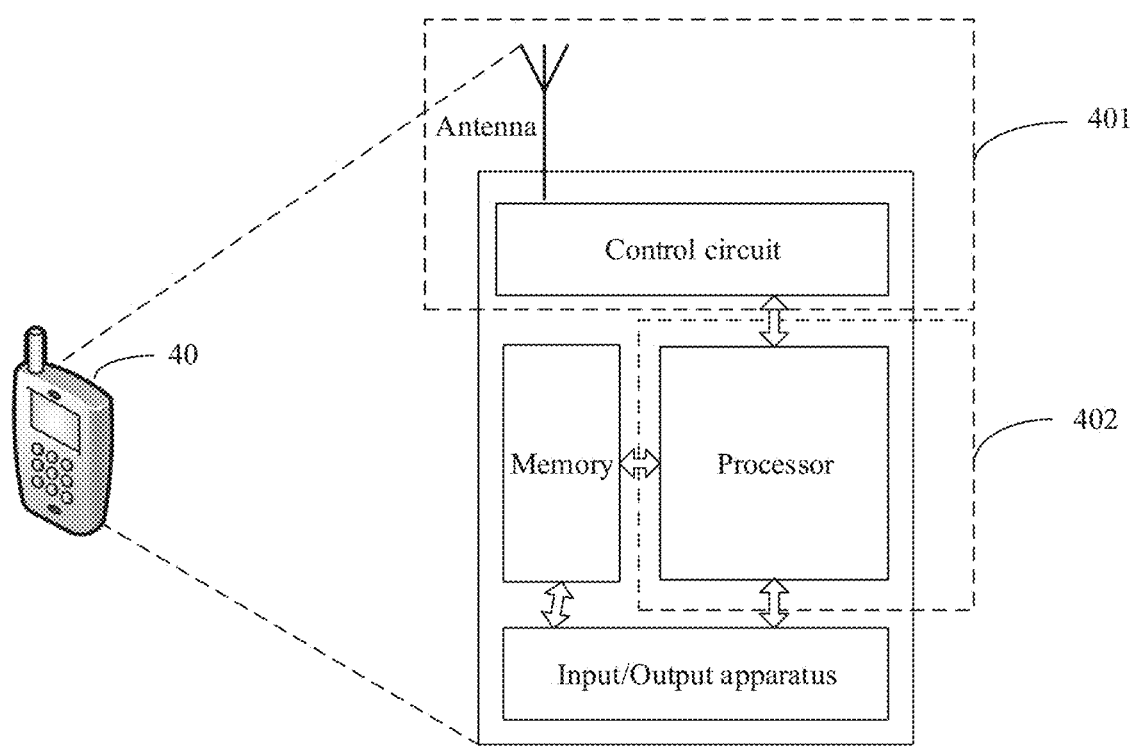
FIG. 4 is a schematic structural diagram of a terminal device according to this application.

FIG. 4 is a schematic structural diagram of a terminal device according to this application. The terminal device may be applied to the system shown in FIG. 1, and perform a function of the terminal device in the foregoing method embodiment. For ease of description, FIG. 4 shows only main components of the terminal device. As shown in FIG. 4, the terminal device 40 includes a processor, a memory, a control circuit, an antenna, and an input/output apparatus. The processor is mainly configured to: process a communications protocol and communication data, control the entire terminal device, execute a software program, and process data of the software program. For example, the processor is configured to support the terminal device in performing actions described in the foregoing method embodiments, for example, determining a quantity X of pieces of QCL information, and determining X pieces of QCL information of an antenna port of a data channel. The memory is mainly configured to store software program and data, for example, store a correspondence between indication information and combination information that is described in the foregoing embodiments. The control circuit is mainly configured to: perform conversion between a baseband signal and a radio frequency signal, and process the radio frequency signal. A combination of the control circuit and the antenna may also be referred to as a transceiver that is mainly configured to receive and transmit a radio frequency signal in an electromagnetic wave form. The input/output apparatus such as a touchscreen, a display, or a keyboard is mainly configured to: receive data entered by a user and output data to the user.

After the terminal device is powered on, the processor may read the software program in a storage unit, explain and execute an instruction of the software program, and process the data of the software program. When data needs to be sent in a wireless manner, the processor performs baseband processing on the to-be-sent data, and outputs a baseband signal to a radio frequency circuit. After performing radio frequency processing on the baseband signal, the radio frequency circuit sends a radio frequency signal through the antenna in the electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 4 shows only one memory and only one processor. An actual terminal device may have a plurality of processors and a plurality of memories. The memory may also be referred to as a storage medium, a storage device, or the like. This is not limited in this embodiment of this application.

In an optional implementation, the processor may include a baseband processor and/or a central processing unit. The baseband processor is mainly configured to process the communications protocol and the communication data. The central processing unit is mainly configured to: control the entire terminal device, execute the software program, and process the data of the software program. Functions of the baseband processor and the central processing unit may be integrated into the processor in FIG. 4. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communications protocol and the communication data may be built in the processor, or may be stored in the storage unit in a form of the software program. The processor executes the software program, to implement a baseband processing function.

In this embodiment of this application, the antenna and the control circuit that have a transceiver function may be considered as a transceiver unit 401 of the terminal device 40, for example, to support the terminal device in performing a receiving function and a sending function described in FIG. 2. The processor having a processing function is considered as a processing unit 402 of the terminal device 40. As shown in FIG. 4, the terminal device 40 includes the transceiver unit 401 and the processing unit 402. The transceiver unit may also be referred to as a transceiver, a transceiver machine, a transceiver apparatus, or the like. Optionally, a device configured to implement a receiving function in the transceiver unit 401 may be considered as a receiving unit, and a device configured to implement a sending function in the transceiver unit 401 may be considered as a sending unit. In other words, the transceiver unit 401 includes the receiving unit and the sending unit. The receiving unit may also be referred to as a receiving machine, an input port, a receiving circuit, or the like. The sending unit may be referred to as a transmitting machine, a transmitter, a transmitting circuit, or the like.

The processing unit 402 may be configured to execute an instruction stored in the memory, to control the transceiver unit 401 to receive a signal and/or send a signal, to complete a function of the terminal device in the foregoing method embodiment. In an implementation, it may be considered that a function of the transceiver unit 401 is implemented by using a transceiver circuit or a transceiver-dedicated chip.

Figure 5:
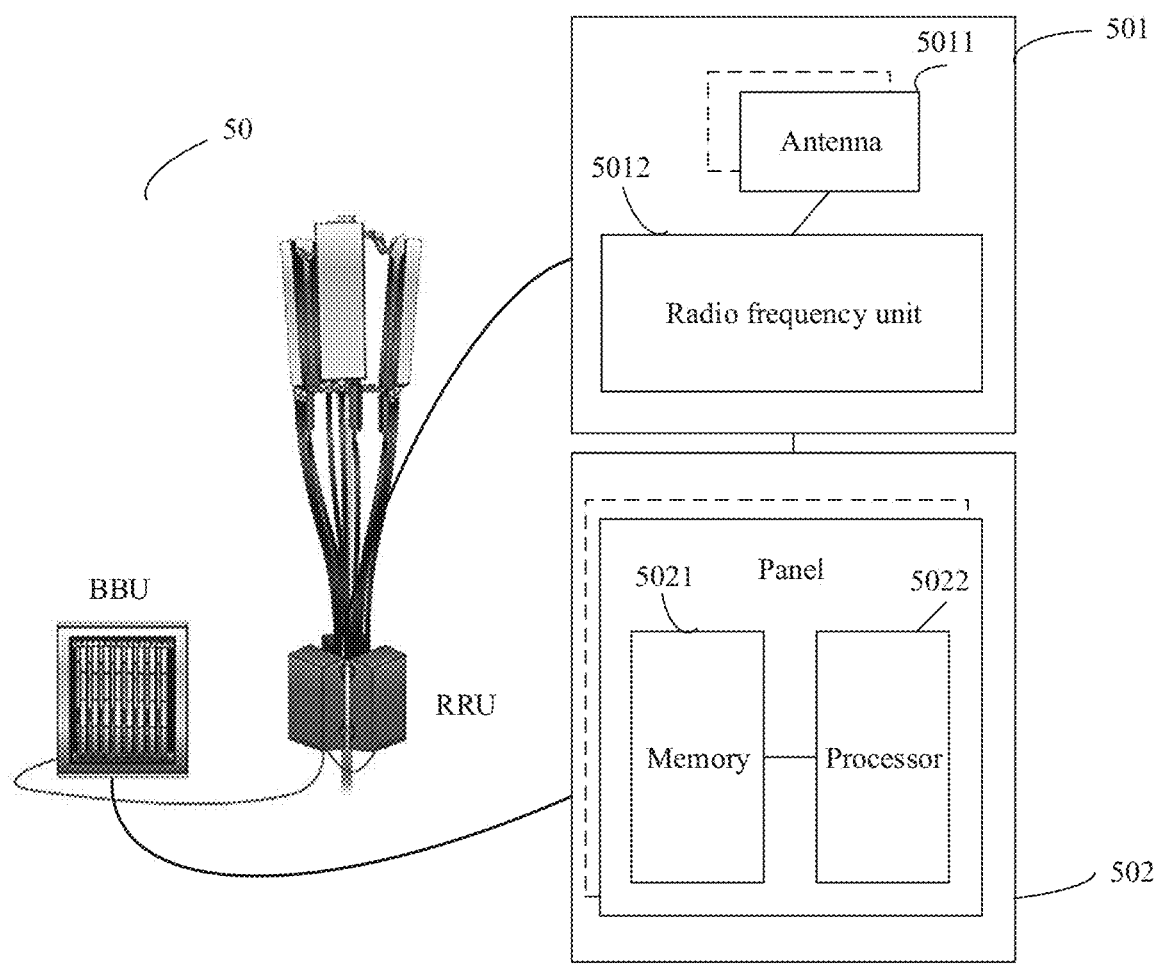
FIG. 5 is a schematic structural diagram of a network device according to this application.

FIG. 5 is a schematic structural diagram of a network device according to this application, for example, may be a schematic structural diagram of a base station. As shown in FIG. 5, the base station may be applied to the system shown in FIG. 1, to perform a function of the network device in the foregoing method embodiment. The base station 50 may include one or more radio frequency units such as a remote radio unit (RRU) 501 and one or more baseband units (BBU) (which may also be referred to as digital units, digital unit, DU) 502. The RRU 501 may be referred to as a transceiver unit, a transceiver machine, a transceiver circuit, a transceiver, or the like, and may include at least one antenna 5011 and a radio frequency unit 5012. The RRU 501 is mainly configured to: receive and send a radio frequency signal and convert a radio frequency signal and a baseband signal. The BBU 502 is mainly configured to: perform baseband processing, control the base station, and the like. The RRU 501 and the BBU 502 may be physically disposed together, or may be physically separated, that is, in a distributed base station.

The BBU 502 is a control center of the base station, may also be referred to as a processing unit, and is mainly configured to complete baseband processing functions such as channel coding, multiplexing, modulation, and spectrum spreading. For example, the BBU (the processing unit) 502 may be configured to control the base station to perform an operation procedure related to the network device in the foregoing method embodiment.

In an example, the BBU 502 may include one or more boards, and a plurality of boards may jointly support a radio access network (such as a 5G network) of a single access standard, or may separately support radio access networks (such as an LTE network, a 5G network, or another network) of different access standards. The BBU 502 further includes a memory 5021 and a processor 5022. The memory 5021 is configured to store a necessary instruction and necessary data. For example, the memory 5021 stores a correspondence between a codebook index and a preceding matrix in the foregoing embodiments. The processor 5022 is configured to control the base station to perform a necessary action, for example, control the base station to perform the operation procedure related to the network device in the foregoing method embodiment. The memory 5021 and the processor 5022 may serve the one or more boards. In other words, a memory and a processor may be independently disposed on each board. Alternatively, a plurality of boards may share the same memory and the same processor. In addition, a necessary circuit may be disposed on each board.

Figure 6:
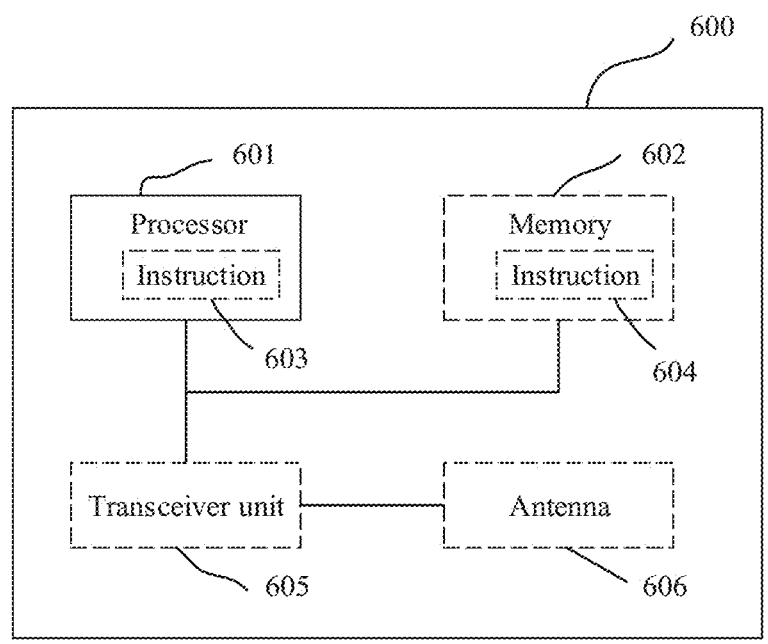
FIG. 6 is a schematic structural diagram of a quasi co-location information determining device according to this application.

FIG. 6 is a schematic structural diagram of a quasi co-location information determining device according to this application. A communications apparatus 600 may be configured to implement the method described in the foregoing method embodiment. Refer to the descriptions in the foregoing method embodiment. The communications apparatus 600 may be a chip, a network device (such as a base station), a terminal device, another network device, or the like.

The communications apparatus 600 includes one or more processors 601. The processor 601 may be a general purpose processor, a dedicated processor, or the like, for example, may be a baseband processor or a central processing unit. The baseband processor may be configured to process a communication protocol and communication data, and the central processing unit may be configured to: control the communications apparatus (such as a base station, a terminal, or a chip), execute a software program, and process data of the software program. The communications apparatus may include a transceiver unit, configured to input (receive) and output (send) a signal. For example, the communications apparatus may be a chip, and the transceiver unit may be an input and/or output circuit or a communications interface of the chip. The chip may be used for a terminal, a base station, or another network device. For another example, the communications apparatus may be a terminal, a base station, or another network device, and the transceiver unit may be a transceiver, a radio frequency chip, or the like.

The communications apparatus 600 includes one or more processors 601, and the one or more processors 601 may implement the method performed by the network device or the terminal device in the embodiment shown in FIG. 2.

In a possible design, the communications apparatus 600 includes a means for generating reference signal indication information and a means for sending the reference signal indication information. One or more processors may be used to implement functions of the means for generating the reference signal indication information and the means for sending the reference signal indication information. For example, the reference signal indication information may be generated by using one or more processors, and sent by using a transceiver, an input/output circuit, or an interface of a chip. For the reference signal indication information, refer to related descriptions in the foregoing method embodiment.

In a possible design, the communications apparatus 600 includes a means for generating reference signal indication information and a means for sending uplink data based on the reference signal indication information. For the reference signal indication information and a method for sending the uplink data based on the reference signal indication information, refer to related descriptions in the foregoing method embodiment. For example, the reference signal indication information may be received by using a transceiver, an input/output circuit, or an interface of a chip, and the uplink data is sent based on the reference signal indication information by using one or more processors.

Optionally, the processor 601 may further implement another function in addition to the method in the embodiment shown in FIG. 2.

Optionally, in a design, the processor 601 may execute an instruction, so that the communications apparatus 600 performs the method described in the foregoing method embodiment. All or some of the instructions may be stored in the processor, for example, the instruction 603, or all or some of the instructions may be stored in the memory 602 coupled to the processor, for example, the instruction 604. Alternatively, the communications apparatus 600 may be enabled, by using both the instructions 603 and 604, to perform the method described in the foregoing method embodiment.

In still another possible design, the communications apparatus 600 may alternatively include a circuit. The circuit may implement a function of the network device or the terminal device in the foregoing method embodiment.

In yet another possible design, the communications apparatus 600 may include one or more memories 602 that store an instruction 604. The instruction may be run on the processor, so that the communications apparatus 600 performs the method described in the foregoing method embodiment. Optionally, the memory may further store data. Optionally, the processor may also store an instruction and/or data. For example, the one or more memories 602 may store a correspondence described in the foregoing embodiments, or a related parameter or table provided in the foregoing embodiments. The processor and the memory may be disposed separately, or may be integrated together.

In still yet another possible design, the communications apparatus 600 may further include a transceiver unit 605 and an antenna 606. The processor 601 may be referred to as a processing unit, and controls the communications apparatus (a terminal or a base station). The transceiver unit 605 may be referred to as a transceiver machine, a transceiver circuit, a transceiver, or the like, and is configured to implement a transceiver on of the communications apparatus by using the antenna 606.

This application further provides a communications system, including the foregoing one or more network devices and one or more terminal devices.

It should be noted that, the processor in the embodiments of this application may be an integrated circuit chip, and has a signal processing capability. In an implementation process, steps in the foregoing method embodiments may be implemented by using a hardware integrated logical circuit in the processor or an instruction in a form of software. The processor may be a general purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the method, the steps, and logical block diagrams that are disclosed in the embodiments of this application. The general purpose processor may be a microprocessor, the processor may be any conventional processor, or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), and is used as an external cache. By way of example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and method described in this specification include but are not limited to these memories and memories of any other proper types.

An embodiment of this application further provides a computer-readable medium. The computer-readable medium stores a computer program. When the computer program is executed by a computer, the method in any method embodiment is implemented.

An embodiment of this application further provides a computer program product. When the computer program product is executed by a computer, the communication method in any method embodiment is implemented.

All or some of the foregoing embodiments may be implemented by using software, hardware, firmware, or any combination thereof. When software is used to implement the method, the method may be implemented completely or partially in a form of a computer program product. The computer program product includes one or more computer instructions. When the computer instructions are loaded and executed on the computer, the procedures or functions according to the embodiments of this application are all or partially generated. The computer may be a general purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD), a semiconductor medium (for example, a solid state disk (SSD)), or the like.

An embodiment of this application further provides a processing apparatus, including a processor and an interface. The processor is configured to perform the communication method in any method embodiment.

It should be understood that the processing apparatus may be a chip. The processor may be implemented by hardware, or may be implemented by software. When implemented by the hardware, the processor may be a logic circuit, an integrated circuit, or the like. When implemented by the software, the processor may be a general purpose processor. The general purpose processor is implemented by reading software code stored in a memory. The memory may be integrated into the processor, may be located outside the processor, or may exist independently.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the entire specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the terms "system" and "network" in this specification may be often used interchangeably in this specification. The term "and/or" in this specification describes only an association relationship for describing associated objects and represents that three relationships may exist. For example, a and/or b may represent three cases: There is only a, there are both a and a, and there is only b, and a and b may be singular or plural. In addition, the character "/" in this specification usually indicates an "or" relationship between the associated objects. In this application, "at least one" means one or more, and "a plurality of" means two or more. "At least one (one piece) of the following" or a similar expression thereof refers to any combination of these items, including any combination of a singular item (piece) or plural items (pieces). For example, at least one (one piece) of a, b, and c may represent: a, b, c, a and b, a and c, b and c, or a, b, and c, and a, b, and c may be singular or plural.

It should be understood that in the embodiments of this application, "B corresponding to A" indicates that B is associated with A, and B may be determined based on A. However, it should be further understood that determining B based on A does not mean that B is determined based on A only. B may alternatively be determined based on A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing system, apparatus, and units, refer to a corresponding process in the method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

With descriptions of the foregoing implementations, a person skilled in the art may clearly understand that this application may be implemented by hardware, firmware, or a combination thereof. When this application is implemented by software, the foregoing functions may be stored in a computer readable medium or transmitted as one or more instructions or code in the computer readable medium. The computer readable medium includes a computer storage medium and a communications medium. The communications medium includes any medium that enables a computer program to be transmitted from one place to another. The storage medium may be any available medium accessible to a computer. The following provides an example but does not impose a limitation: The computer readable medium may include a RAM, a ROM, an EEPROM, a CD-ROM, or another compact disc storage or magnetic disk storage medium, or another magnetic storage device, or any other medium that can carry or store expected program code in a form of an instruction or a data structure and can be accessed by a computer. In addition, any connection may be appropriately defined as a computer readable medium. For example, if software is transmitted from a website, a server, or another remote source by using a coaxial cable, an optical fiber/cable, a twisted pair, a digital subscriber line (DSL) or wireless technologies such as infrared ray, radio, and microwave, the coaxial cable, optical fiber/cable, twisted pair, DSL, or the wireless technologies such as infrared ray, radio, and microwave are included in fixation of a medium to which they belong. A disk and a disc used in this application includes a compact disc (CD), a laser disc, an optical disc, a digital versatile disc (DVD), a floppy disk, and a Blu-ray disc. The disk usually copies data in a magnetic manner, but the disc copies data optically by using a laser. The foregoing combination should also be included in the protection scope of the computer readable medium.

In summary, the foregoing descriptions are merely example embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A communication method, comprising:
determining, by a communications apparatus, two pieces of quasi co-location (QCL) information of antenna ports of a demodulation reference signal (DMRS) of a data channel based on a predetermined rule in response to determining that a QCL configuration information indicates a QCL type D, and an offset between the data channel and a reception of downlink control information (DCI) scheduling the data channel is less than a threshold, wherein the QCL configuration information includes at least two transmission configuration indication (TCI) states, and the predetermined rule comprises one piece of indication information with smallest identifiers among an indication information set, wherein each indication information in the indication information set is associated with two reference signal (RS) sets and is used to indicate QCL information of antenna ports of the DMRS, each of the two RS sets comprising one or more RS;
and
performing, by the communications apparatus, a communication on the data channel based on the determined two pieces of QCL information of the antenna ports of the DMRS of the data channel.

2. The method according to claim 1, wherein the determining two pieces of QCL information comprises: when an interval between a time of receiving performed on the data channel and a time of receiving performed on a control channel on which downlink control information corresponding to the data channel is located is less than a threshold, or when DCI corresponding to the data channel does not comprise indication information used to indicate the QCL information of the antenna port of the data channel, determining two pieces of QCL information, wherein the DCI corresponding to the data channel is used to indicate scheduling information of the data channel.

3. The method according to claim 1, wherein the determining two pieces of QCL information comprises: determining two pieces of QCL information based on at least one of the following parameters: QCL configuration information of a terminal device, an obtained synchronization signal block (SSB) feature, an obtained subcarrier spacing, a transmission mode of the terminal device, an obtained DCI feature, an obtained QCL capability, an obtained maximum quantity of pieces of DCI that needs to be detected, a capability of the terminal device, or an obtained data transmission scenario.

4. The method according to claim 3, wherein:
the QCL configuration information comprises indication information used to indicate the QCL information of the antenna port of a reference signal, wherein the indication information comprises a QCL type, and wherein the QCL type is used to indicate a QCL parameter;
the SSB feature comprises a quantity of SSBs transmitted by a network device in one or more time units;
the subcarrier spacing comprises at least one of a subcarrier spacing of remaining minimum system information (RMSI), a subcarrier spacing of an SSB, or a subcarrier spacing of a bandwidth part (BWP);

the transmission mode comprises at least one of single-cell transmission, coordinated transmission, dynamic point selection (DPS) transmission, or non-coherent joint transmission (NCJT);

the DCI feature comprises at least one of a DCI format, a quantity of bits comprised in DCI, or a feature of a specific field of the DCI;

the QCL capability comprises at least one of a quantity of pieces of indication information that is supported by the terminal device and that is used to indicate the QCL information of the antenna port of the reference signal, or a quantity of reference signal sets (RS sets) associated with the indication information that is supported by the terminal device and that is used to indicate the QCL information of the antenna port of the reference signal;

at least one of: the capability of the terminal device comprises a quantity of panels supported by the terminal device, or a maximum quantity of pieces of DCI that can be detected by the terminal device; and the data transmission scenario comprises a scenario in which it is determined that the quantity of pieces of QCL information is one, or a scenario in which the quantity of pieces of QCL information cannot be determined.

5. The method according to claim 4, wherein the determining two pieces of QCL information based on at least one of the following parameters comprises: when it is determined that the parameter meets at least one of the following conditions, determining two pieces of QCL information, wherein:

the QCL configuration information of the terminal device comprises a spatial QCL parameter or comprises a QCL type D;

the quantity of SSBs transmitted by the network device in N time units is greater than or equal to a first threshold, and N is a positive integer;

the obtained subcarrier spacing is greater than or equal to a second threshold;

the transmission mode of the terminal device is a second transmission mode, wherein the second transmission mode comprises one of coordinated transmission, dynamic point selection DPS transmission, or non-coherent joint transmission NCJT;

the DCI format is a second format, wherein the second format is a DCI format used in the second transmission mode;

the quantity of bits of the DCI is greater than or equal to a third threshold;

the obtained DCI comprises a specific field, or a value of the specific field of the obtained DCI belongs to a specific range;

the quantity of pieces of indication information that is supported by the terminal device and that is used to indicate the QCL information of the antenna port of the reference signal is at least two;

the quantity of RS sets associated with the indication information that is supported by the terminal device and that is used to indicate the QCL information of the antenna port of the reference signal is at least two;

the maximum quantity of pieces of DCI that needs to be detected is greater than 1;

the maximum quantity of pieces of DCI that can be detected by the terminal device is greater than 1;

the quantity of panels supported by the terminal device is greater than 1; and the data transmission scenario is that the quantity of pieces of QCL information cannot be determined, or it is determined that the quantity of pieces of QCL information is greater than 1.

6. The method according to claim 1, wherein the communications apparatus is a network device or a terminal device.

7. The method according to claim 6, further comprising:
determining that a quantity of RS sets supported by the terminal device and associated with the indication information is two.

8. A communications apparatus, comprising at least one processor, wherein the at least one processor is coupled to a memory;

wherein the memory is configured to store a computer program, and wherein the computer program stored in the memory, when executed by the at least one processor, enables the apparatus to perform operations comprising:

determining two pieces of quasi co-location (QCL) information of antenna ports of a demodulation reference signal (DMRS) of a data channel based on a predetermined rule in response to determining that a QCL configuration information indicates a QCL type D, and an offset between the data channel and a reception of downlink control information (DCI) scheduling the data channel is less than a threshold, wherein the QCL configuration information includes at least two transmission configuration indication (TCI) states, and the predetermined rule comprises one piece of indication information with smallest identifiers among an indication information set, wherein each indication information in the indication information set is associated with two reference signal (RS) sets and is used to indicate QCL information of antenna ports of the DMRS, each of the two RS sets comprising one or more RS;

and performing a communication on the data channel based on the determined two pieces of QCL information of the antenna ports of the DMRS of the data channel.

9. The apparatus according to claim 8, wherein the determining two pieces of QCL information comprises: when an interval between a time of receiving performed on the data channel and a time of receiving performed on a control channel on which downlink control information corresponding to the data channel is located is less than a threshold, or when DCI corresponding to the data channel does not comprise indication information used to indicate the QCL information of the antenna port of the data channel, determining two pieces of QCL information, wherein the DCI corresponding to the data channel is used to indicate scheduling information of the data channel.

10. The apparatus according to claim 8, wherein the determining two pieces of QCL information comprises: determining two pieces of QCL information based on at least one of the following parameters: QCL configuration information of a terminal device, an obtained synchronization signal block (SSB) feature, an obtained subcarrier spacing, a transmission mode of the terminal device, an obtained DCI feature, an obtained QCL capability, an obtained maximum quantity of pieces of DCI that needs to be detected, a capability of the terminal device, or an obtained data transmission scenario.

11. The communications apparatus according to claim 8, wherein the communications apparatus is a network device, a chip for the network device, a terminal device, or a chip for the terminal device.

12. The communications apparatus according to claim 11, wherein the operations further comprise:

determining that a quantity of RS sets supported by the terminal device and associated with the indication information is two.

13. A non-transitory computer-readable storage medium, comprising a computer program, wherein the computer program, when executed by a computer, causes the computer to perform operations comprising:

determining two pieces of quasi co-location (QCL) information of antenna ports of a demodulation reference signal (DMRS) of a data channel based on a predetermined rule in response to determining that a QCL configuration information indicates a QCL type D, and an offset between the data channel and a reception of downlink control information (DCI) scheduling the data channel is less than a threshold, wherein the QCL configuration information includes at least two transmission configuration indication (TCI) states, and the predetermined rule comprises one piece of indication information with smallest identifiers among an indication information set, wherein each indication information in the indication information set is associated with two reference signal (RS) sets and is used to indicate QCL information of antenna ports of the DMRS, each of the two RS sets comprising one or more RS;

and
performing a communication on the data channel based on the determined two pieces of QCL information of the antenna ports of the DMRS of the data channel.

14. The non-transitory computer-readable storage medium according to claim 13, wherein the determining two pieces of QCL information comprises: when an interval between a time of receiving performed on the data channel and a time of receiving performed on a control channel on which downlink control information corresponding to the data channel is located is less than a threshold, or when DCI corresponding to the data channel does not comprise indication information used to indicate the QCL information of the antenna port of the data channel, determining two pieces of QCL information, wherein the DCI corresponding to the data channel is used to indicate scheduling information of the data channel.

15. The non-transitory computer-readable storage medium according to claim 13, wherein the determining two QCL information comprises: determining two pieces of QCL information based on at least one of the following parameters: QCL configuration information of a terminal device, an obtained synchronization signal block (SSB) feature, an obtained subcarrier spacing, a transmission mode of the terminal device, an obtained DCI feature, an obtained QCL capability, an obtained maximum quantity of pieces of DCI that needs to be detected, a capability of the terminal device, or an obtained data transmission scenario.

* * * * *